United States Patent
Grinnell

(10) Patent No.: US 11,812,827 B2
(45) Date of Patent: Nov. 14, 2023

(54) ADJUSTABLE MOUNT WITH LOCKING ELEMENT

(71) Applicant: Axon Enterprise, Inc., Scottsdale, AZ (US)

(72) Inventor: Edward Grinnell, Peoria, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/533,088

(22) Filed: Nov. 22, 2021

(65) Prior Publication Data
US 2022/0079301 A1     Mar. 17, 2022

Related U.S. Application Data

(63) Continuation of application No. 16/265,993, filed on Feb. 1, 2019, now Pat. No. 11,178,939.

(51) Int. Cl.
*A44B 17/00*     (2006.01)

(52) U.S. Cl.
CPC ...... *A44B 17/0047* (2013.01); *A44B 17/0035* (2013.01); *A44B 17/0076* (2013.01)

(58) Field of Classification Search
CPC ............ A44B 17/0047; A44B 17/0035; A44B 17/0076; A45F 2200/0533; A45F 5/02; F16M 11/041; F16M 13/04; G03B 17/566; G03B 17/561; F16B 2/12
See application file for complete search history.

(56) References Cited

U.S. PATENT DOCUMENTS

| | | | |
|---|---|---|---|
| 2,121,147 A | 6/1938 | Goodrich | |
| 3,860,209 A * | 1/1975 | Strecker | B63B 25/28 403/348 |
| 5,375,749 A | 12/1994 | Oliva | |
| 7,481,020 B1 | 1/2009 | Ruzicka | |
| 7,784,158 B2 | 8/2010 | Doyle | |
| 9,395,031 B1 | 7/2016 | Clearman | |
| 9,568,144 B2 * | 2/2017 | Pernu | A45F 5/02 |
| 10,165,851 B1 | 1/2019 | Downs | |
| 10,838,285 B2 | 11/2020 | Mayville | |
| 2006/0207072 A1 * | 9/2006 | Chen | A44B 11/2588 24/590.1 |
| 2011/0142436 A1 | 6/2011 | Eynav | |
| 2014/0092299 A1 | 4/2014 | Phillips et al. | |
| 2016/0316900 A1 * | 11/2016 | Hanchett | A45F 5/02 |
| 2017/0111555 A1 | 4/2017 | Davis et al. | |
| 2017/0235211 A1 | 8/2017 | Eynav | |
| 2017/0284598 A1 | 10/2017 | Shimonishi et al. | |
| 2018/0008009 A1 * | 1/2018 | Hawkins | A45F 5/02 |
| 2018/0167537 A1 | 6/2018 | Takada et al. | |
| 2018/0338586 A1 * | 11/2018 | Hopper | A41F 1/00 |
| 2019/0113058 A1 | 4/2019 | Wine et al. | |

* cited by examiner

*Primary Examiner* — Robert Sandy
*Assistant Examiner* — Rowland Do
(74) *Attorney, Agent, or Firm* — Andrew Graham

(57) ABSTRACT

A mount secures an object to sheets of material with one or more material thicknesses. The mount includes an inner plate and an outer plate. The outer plate includes a coupler for the object and one or more contact surfaces associated with one or more material thicknesses. The inner plate includes a retention structure to engage a contact surface of the outer plate. The outer plate may comprise a locking element to A mounting system includes a mount and a coupler integrated with the object to be secured to a sheet of material. The object may be a camera and the mount may be a camera mount.

21 Claims, 9 Drawing Sheets

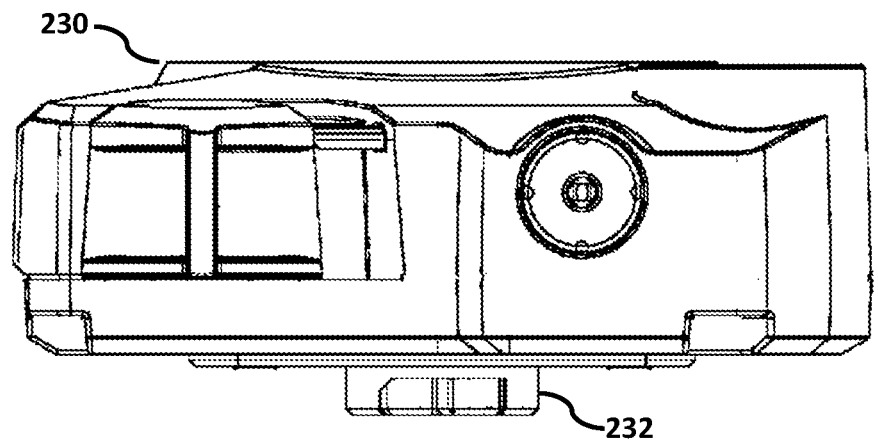
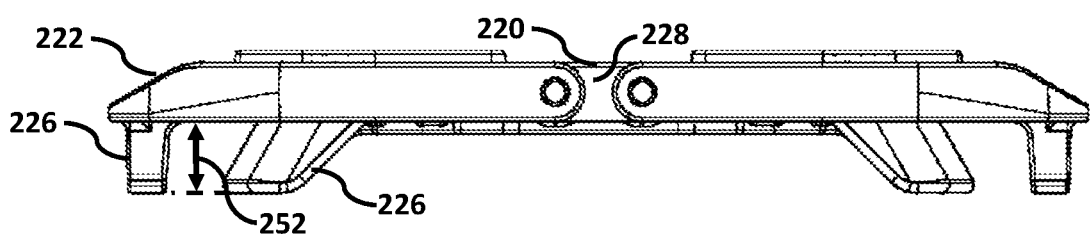
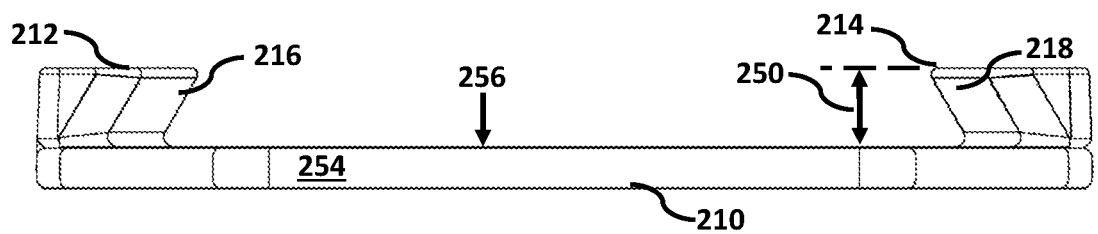
Fig. 2

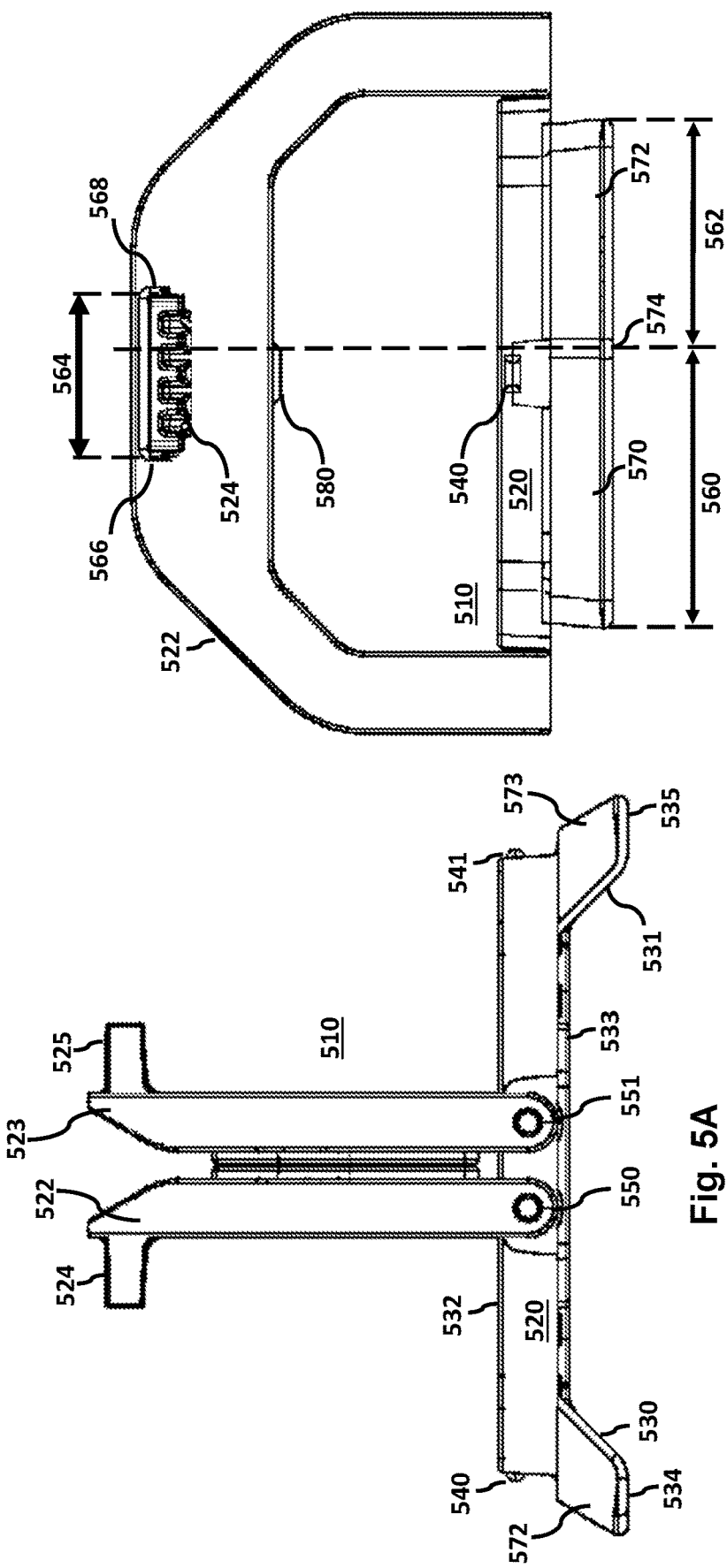

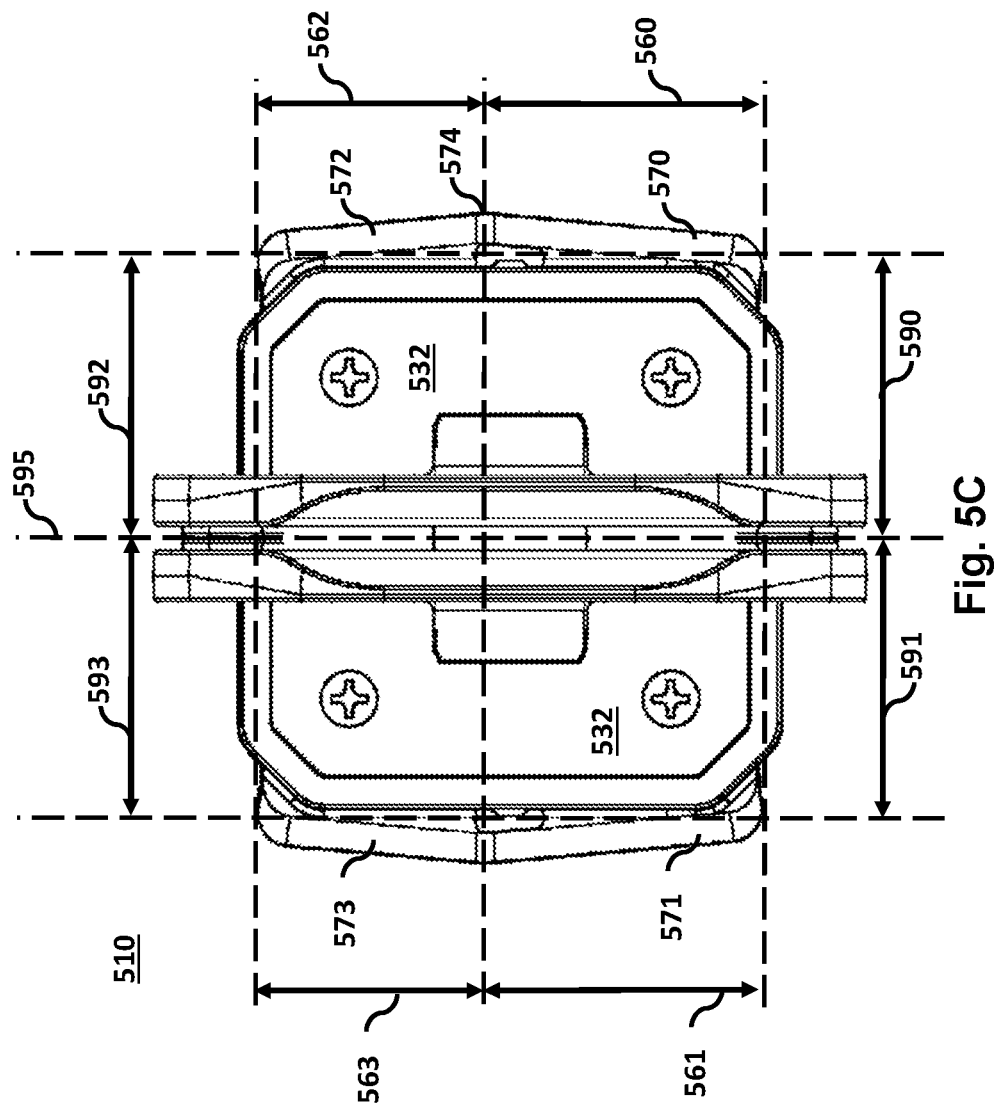

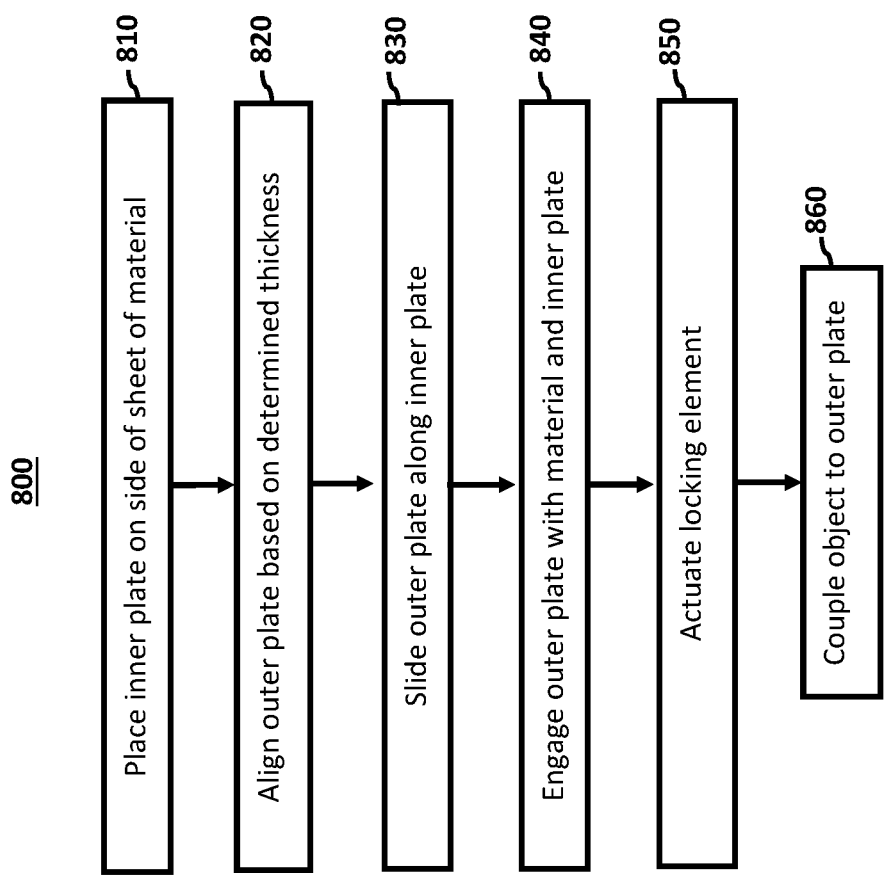

ADJUSTABLE MOUNT WITH LOCKING ELEMENT

FIELD OF THE INVENTION

Embodiments of the present invention relate to mounts, mounting systems, and methods for securing an object to a sheet of material.

BACKGROUND OF THE INVENTION

A mount may attach an object to a sheet of material. One or more magnets may hold the mount to the sheet of material. However, magnets alone may provide insufficient force to reliably attach the object to the sheet of material. For example, a mount that relies on magnets may become dislodged from the sheet of material when the sheet of material experiences a sudden change in motion or acceleration. A mount relying on magnets may also become dislodged in an active environment where incidental contact may occur between the object and other physical items in the environment. In this context, a need exists for mounting an object to a sheet of material that does not rely on one or more magnets alone to attach the object to the sheet of material.

BRIEF SUMMARY OF INVENTION

This summary is provided to introduce a selection of concepts in a simplified form. The concepts are further described below in the detailed description. This summary is not intended to identify key features of the claimed subject matter, nor is it intended to be used as an aid in determining the scope of the claimed subject matter.

In some embodiments, a mount for multiple material thicknesses is provided. The mount comprises an outer plate and an inner plate. The outer plate includes a coupler configured to physically connect the outer plate to an object, a first contact surface associated with a first material thickness, and a second contact surface associated with a second material thickness. The inner plate includes a first retention structure. The first retention structure is configured to separately engage either the first contact surface in a first orientation of the outer plate relative to the inner plate or the second contact surface in a second orientation of the outer plate relative to the inner plate.

In some embodiments, a mounting system for multiple material thicknesses is provided. The mount comprises an inner plate, outer plate, and a second coupler. The outer plate includes a first coupler configured to physically connect the outer plate to an object, a first contact surface associated with a first material thickness, and a second contact surface associated with a second material thickness. The inner plate includes a first retention structure. The first retention structure is configured to separately engage either the first contact surface in a first orientation of the outer plate relative to the inner plate or the second contact surface in a second orientation of the outer plate relative to the inner plate. The second coupler is integrated with the object and configured to connect to the first coupler to secure the object to the outer plate.

In some embodiments, a method of securing an object to a sheet of material using a mount is provided. The method comprises aligning an outer plate relative to an inner plate in one of a first orientation associated with a first material thickness and a second orientation associated with a second material thickness. The method further comprises engaging either a first contact surface of the outer plate with a first retention structure of the inner plate in accordance the first orientation or a second contact surface of the outer plate with the first retention structure in accordance with the second orientation. The mount is retained on the sheet of material based on the engaging of the first contact surface or the second contact surface with the first retention structure. The method further comprises connecting the object to a coupler on the outer plate to secure the object on the outer plate.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is an illustration of a side view of an example embodiment of a mounting system according to various aspects of the present disclosure;

FIGS. 5A-5C are illustrations of different views of an outer plate according to various aspects of the present disclosure;

FIG. 8 is flowchart that illustrates an example embodiment of securing an object to a sheet of material using a mount according to various aspects of the present disclosure.

DETAILED DESCRIPTION

Figure 1:
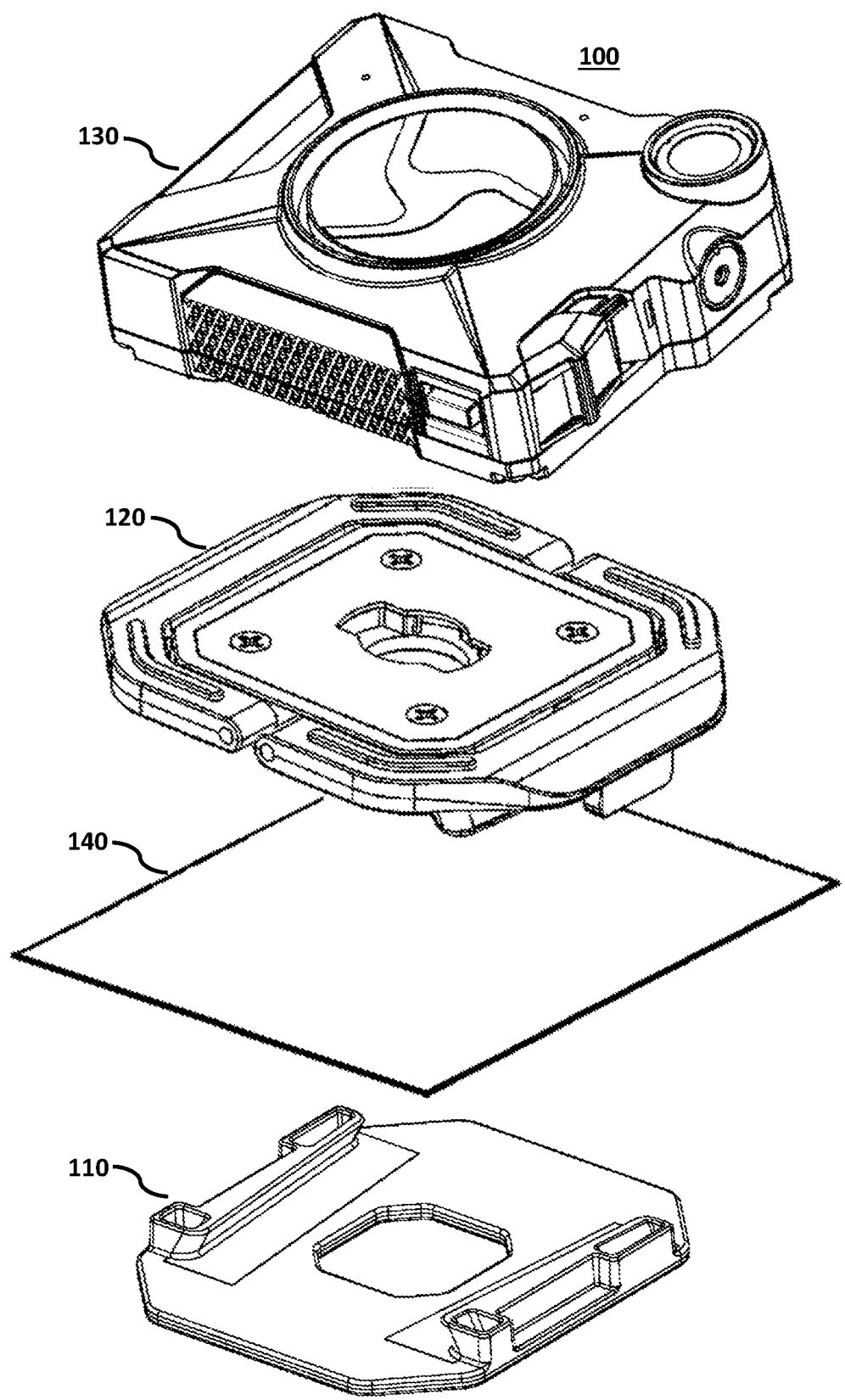
FIG. 1 is an illustration of an example embodiment of a mounting system according to various aspects of the present disclosure.

An object may be releasably secured to a sheet of material via a mount. Particularly, the object may be coupled to the mount and the mount may be securely retained on the sheet of material, thereby securing the object on the sheet of material using the mount.

An object secured on a sheet of material resists forces that may be applied to or encountered by the sheet of material or the object. The object may be physically secured to the sheet of material via a mount. The secured object resists being dislodged or physically detached from the sheet of material. A sudden change in motion does not cause the secured object to separate from the sheet of material, nor does incidental contact encountered by the object in an active environment.

A secured object is prevented from being repositioned on the sheet of material. For example, an object secured on a sheet of material at an original location resists being moved to a different location on the sheet of material. The secured object resists lateral forces that may be applied to the object, parallel to a surface of the sheet of material. The secured object resists being pulled, pushed, rubbed, or scraped away from the sheet of material. The secured object remains affixed to the sheet of material until one or more predetermined motions or forces are applied to the object and/or mount.

Securing an object to a sheet of material includes coupling the object to the mount. The object may be physically connected to the mount via two or more mechanical couplers. When coupled, the object resists being physically separated from the mount. The coupled object resists movement or rotation relative to the mount in one or more first directions. The coupled object may be selectively decoupled by applying movement or force in at least one second direction, different from the one or more first direction. For example, an object may be coupled by rotation relative to the mount in a first direction and decoupled from the mount by relative rotation in a second direction, different from the first direction.

Securing an object to a sheet of material includes removably retaining a mount on the sheet of material. The retained mount is attached to at least one surface of the sheet of material. The retained mount may be locked to the sheet of material. The retained mount resists being physically separated or dislodged from the sheet of material. The retained mount may be selectively released from the sheet of material.

A mount retained on a sheet of material is prevented from being repositioned on the sheet of material. For example, a mount retained on a sheet of material at an original location resists movement to a different location on the sheet of material. The retained mount withstands lateral or rotational forces that may be applied to the mount, including those that are applied parallel to a surface of a sheet of material. The mount resists being slid, pushed, or pulled along a surface of the sheet of material to which the mount is retained.

A retained mount remains attached to the sheet of material until one or more predetermined movements are applied to the mount. The predetermined movements may be applied to portions of the mount. The predetermined movements may include moving portions of the mount relative to each other. The predetermined movements are different from one or more movements that may be encountered by the sheet of material or the mount during use of an object coupled to the mount. One or more of the predetermined movements may be prevented when an object is coupled to the mount. The retained mount may be released from the sheet of material after the one or more predetermined movements are applied to the mount.

Retention of a mount on a sheet of material avoids damaging the sheet of material. For example, the mount of sheet of material may not tear, rend, or otherwise alter a structure of the sheet of material. The mount may compress one or more portions of the sheet of material without permanently changing the physical state of the sheet of material. The mount may be repeatedly retained on the sheet of material and released from the sheet of material without causing damage to the sheet of material. In embodiments according to various aspects of the present disclosure, the mount does not cause or require openings to be provided in the sheet of material. The mount may be retained on a sheet of material independent of whether an opening is provided at a location on the sheet of material at which the mount is retained on the sheet of material.

In the context of law enforcement, a mount may be used to secure an object to an article of clothing. The mount may secure the object to a shirt, jacket, or another part of a uniform worn by a law enforcement officer. The mount may be used to secure the object to a particular part of an article of clothing, such as a shirt body or a pocket. Each article of clothing includes a sheet of material on which the mount may be retained.

A mount may also be used to secure an object on equipment or gear carried or worn by a law enforcement officer. A handle, strap, panel, or other part of the equipment or gear may be engaged by the mount to secure the object to the equipment or gear. Each piece of gear or equipment includes a sheet of material on which the mount may be retained.

A sheet of material has a thickness. The thickness is a dimension of the sheet of material. The thickness of a sheet of material is alternately referred to herein as a material thickness. The thickness of a sheet of material may be a distance between two sides of the sheet of material. The two sides may be opposite sides of the sheet of material, wherein the thickness includes a distance between a first surface on a first side of the sheet of material and a second surface on a second side of the sheet of material. A mount may be engaged with the two sides of a sheet of material associated with the thickness of the sheet of material. The thickness of the sheet of material may depend on one or more physical properties of the sheet of material, including one or more of a density, number of layers, combination, or relative arrangement of one or more materials from which the sheet of material is formed. The thickness of a sheet of material may include a thickness of the sheet of material when the sheet of material is compressed.

A thickness of a sheet of material may also include a relative thickness. The relative thickness may be determined in comparison with a reference dimension, such as a thickness of another object. For example, a first sheet of material with a thickness larger than a thickness of another sheet of material may be considered thick. The first sheet of material may be determined to have a thicker or thick material thickness. A second sheet of material with a thickness smaller than a thickness of another sheet of material may be considered thin. The second sheet of material may be determined to have a thinner or thin material thickness.

Sheets of material may have different thicknesses. For example, a first sheet of material may have a thickness greater than a second sheet of material. A distance between two sides of the first sheet of material may be larger than a distance between two sides of the second sheet of material. Alternately, a distance between two sides of the first sheet of material may be smaller than a distance between two sides of the second sheet of material.

A thickness of a sheet of material may relate to type of clothing, gear, or equipment or a functional property of the clothing, gear, or equipment on which the sheet of material is included. For example, a sheet of material that is part of a jacket may have a thickness that is greater than a thickness of a second, different sheet of material that is part of a shirt. A first sheet of material designed for use in warm temperatures may have a first thickness that is less than a second thickness of a second sheet of material designed for use in cold temperatures. Similarly, a first sheet of material designed to be rugged or durable may have a first thickness that is greater than a second thickness of a second sheet of material that is designed to provide a more limited degree of protection, ruggedness, or durability. As another example, a sheet of material that is part of a strap of a piece of equipment may have a thickness that is greater than a thickness of a different sheet of material that is part of a shirt pocket.

In embodiments according to various aspects of the present disclosure, a mount engages a sheet of material across a thickness of the sheet of material. The mount may include two or more components that engage a first side of the sheet of material and a second side of the sheet of material. The two or more components may compress the sheet of material across the thickness. Retaining the mount on the sheet of material includes engaging the sheet of material between the two or more components.

In embodiments according to various aspects of the present disclosures, a component engages another component. The component may be one of a sheet of material, a component of a mount, and an object to be securely coupled to the mount. Each component may include a structure that engages the other component. Each component may include a surface that engages the other component, wherein the surface may be on the component or a structure of the component. For example, a component may engage another component via a surface of the other component or a structure of the other component. A structure of a component may engage another component via a surface of the other component or a structure of the other component. A surface of a component may engage another component via a surface of the other component or a structure of the other component.

A component may engage another component directly. The component may be placed in direct, physical contact with the other component. For example, a first component, structure, or surface may be placed in direct contact with a second component, structure, or surface. One or more of the first structure, component, or surface may physically touch one or more of the second surface, structure, or component. The first component, structure, or surface may abut the second component, structure, or surface. A continuous physical dimension may be formed when the first component, structure, or surface engages the second component, structure, or surface. No gap, spacing, or opening may exist between two directly engaged components. Another component, structure, or surface may not be disposed between the engaged two components.

Alternately, two components may be engaged indirectly via a third component. The third component may be placed between the two components. The two components may be disposed adjacent to each other, separated by the third component. The two components may be directly engaged to opposite sides of the third component by which they are indirectly engaged. The two components may be physically separated from each other, but interconnected via the third component. The third component fills a space between the two components, such that a continuous physical dimension is established between the two components via the third component.

For example, two components of a mount may be engaged via a sheet of material. The sheet of material may be placed between pairs of adjacent structures and/or surfaces of the component. The sheet of material may fill a space between the components, such that a continuous physical structure is presented between a first structure or surface of a first component and a second structure or surface of a second component via the sheet of material. The sheet of material may interconnect the first structure or surface and the second structure or surface. The first component may be engaged with the second component via the sheet of material, wherein the first component is engaged with a first surface of the sheet of material while the second structure or surface is engaged with a second surface of the sheet of material, the first and second surfaces being on directly opposite sides of the sheet of material.

In embodiments according to various aspects of the presentation, two or more components of a mount are engaged with each other in accordance with an orientation between the components. The orientation may include one or more of a relative position and angle between two or more structures or surfaces of the components. In the orientation, two or more structures or surfaces of the components may be facing toward each other, such that the two or more structures are engaged, configured to be engaged, or enabled to be engaged with each other. For example, an orientation may include a contact surface of a first component of the mount positioned and angled relative to a retention surface of a second component of the mount, wherein the contact surface faces toward the retention surface and is engaged or is configured to be engaged with the retention surface. In an orientation, two components may be engaged by being moved directly toward each other.

In embodiments according to various aspects of the presentation, two or more components of a mount are engaged in accordance with one orientation among two or more different, possible orientations in which the components may be engaged. Each orientation may involve the same components of the mount, but different sets of two or more structures or surfaces of the components. For example, one orientation may include engaging a first set of structures or surfaces of the components, while another orientation may include engaging a different set of structures or surfaces of the components. Each different set of structures or surfaces may include at least one structure or surface that is not included in another set of structures or surfaces. For example, a first orientation may include a first contact surface of the mount engaged with a retention structure of the mount, while a second orientation may include a second contact surface of the mount engaged with the retention structure of the mount. The retention structure is the same retention structure in each set, but the contact surfaces are different between the two different sets of structures or surfaces. In this example, a single component of the mount may include both the first and second contact surfaces. Different sets of structures or surfaces may also include at least one structure or surface that is not engaged in the orientation, such as the second contact surface in the first orientation and the first contact surface in the second orientation in the preceding example.

Different sets of structures or surfaces may also include at least a pair of structures or surfaces that are engaged with each other in each of the respective orientations. For example, a first structure of a mount and a second structure of a mount may be engaged with each other in two or more different orientations, though each orientation includes at least one other structure or surface that is not engaged with a same other structure or surface in the other orientations. In another example, a first surface of a mount, such as a guide surface, may be engaged with a common surface, such as a support surface of a mount, in each of two or more orientations of the mount. In embodiments, the different orientations and their respective different sets of structures or surfaces enable the same mount to be securely retained on different sheets of material, wherein each sheet of material has a different material thickness. The thickness of a sheet of material may be associated with a particular structure or surface of the mount in a particular orientation of one component of the mount relative to another component of the mount.

In embodiments according to various aspects of the present disclosure, a mount includes multiple components. The multiple components may include at least two plates. For example, a mount may include at least a first plate and a second plate.

In embodiments, a first plate of a mount is an inner plate. The inner plate may be configured to be positioned on a side of a sheet of material opposite a side on which an object is coupled to the mount. The inner plate may not include a coupler by which the inner plate may be securely coupled to the object.

In embodiments, a second plate of a mount is an outer plate. The outer plate may be configured to be disposed proximate an object to be secured by the mount. The outer plate may be positioned on an opposite side of a sheet of material from a first plate of the mount.

A mounting system may include two or more components or structures to secure an object to a sheet of material. The two or more components or structures may include components of a mount. The two more structures may include components or structures that retain the mount to the sheet of material. The two or more structures may also include components or structures that couple the object to the mount.

An object to be secured by a mount may include various devices. In embodiments according to various aspects of the present disclosure, the object is a camera. In embodiments where a sheet of material is part of a uniform or other wearable article, the object may be a wearable camera, a body camera, a body-worn camera, or other portable camera.

A camera may include at least one sensor, processor, user interface, memory, and battery. The at least one sensor includes one or more image sensors and may further include one or more audio sensors, motion sensors, biometric sensors, and position sensors. The at least one processor controls the at least one sensor to capture data and transfer the captured data from the at least one sensor to the memory. The at least one memory may include volatile and/or non-volatile memory. The at least one memory may provide non-transitory storage of data captured by the at least one sensor. The at least one battery may provide power to enable capture, transfer, and storage of data by the camera. The at least one battery may be rechargeable and provide power to the processor and other elements of the camera when the camera is not connected to an external source of power.

An object may also include other types of devices. For example, an object may be another, non-video recording device, such as an audio recorder, biometric recorder, and/or position recorder. An object may also include a communication device, such as a smartphone, portable telephone, and/or cellular phone. An object may include other forms of gear, such as those that are non-electronic and do not include or require a battery to perform a function.

According to various aspects of the present disclosure, an object may include combinations of devices. For example, an object may include a camera that also provides one or more functions of a communications device, such as the ability to transmit video, audio, and/or other data to a remote device and/or receive video, audio, and/or other data from a remote device via a network.

In embodiments according to various aspects of the present disclosure, an object to be secured to a sheet of material via a mount is portable. For example, an object may weigh less than four ounces, less than eight ounces, less than twelve ounces, or less than one pound. Outer dimensions of a housing for the object may be less than two inches in depth, less than four inches in height, and/or less than three inches in width. Outer dimensions of a housing for the object may also be less than three inches in depth, less than six inches in height, and/or less than five inches in width. Such weights and dimensions are merely examples; in embodiments, a mount may secure an object to a sheet of material that is portable, yet has a different weight and/or one or more different dimensions.

In embodiments according to various aspects of the present disclosure, an object includes a coupler. The coupler may be configured to couple the object to another component, such as an outer plate. The coupler may physically interconnect the object to the other component. The coupler may be mechanical fastener or at least part of a mechanical fastener. The coupler may be integral, fixed, or permanently attached to the object. The coupler may releasably connect the object to the other component.

In embodiments, the coupler includes one of a key and a receiver. The coupler may be the key, configured to be inserted into a receiver on another component. The coupler may also be a receiver, configured to receive a key inserted therein. Either the key or the received may releasably connect the object to the other component.

In embodiments according to various aspects of the present disclosure, a sheet of material has various properties. In many embodiments, the sheet of material is flexible. When not engaged by a mount, the sheet of material may be planar or substantially planar. The sheet of material may also be continuous and/or solid in an area corresponding to a width and height of an adjacent an inner plate or outer plate. The sheet of material may also include one or more surface features, such as a seam or a button, yet remain capable of supporting a mount. A width and length of a sheet of material may be substantially greater than a thickness of sheet of material. The sheet of material may be deformed. For example, a shape of the sheet of material may be altered when the sheet of material is engaged by one or more of a first plate and a second plate. The sheet of material may include at least one layer of fabric. The sheet of material may include one or more fabrics, such as cotton, polyester, polyester blend, and wool. A thickness of the sheet of material may be based on one or more physical properties of the sheet of material, including one or more of a density, number of layers, combination, state of compression, and relative arrangement of one or more materials of which the sheet is formed, as well as combinations of these properties.

In embodiments, a sheet of material may be part of an overall article. The article may be an article of clothing. In the context of law enforcement, the article of which the sheet of material may be part may include one or more of a shirt, jacket, vest, pocket, or other part of a uniform. The article may also be part of a piece of equipment or gear carried or worn by a law enforcement officer. The sheet of material may also be part of other articles, including straps, curtains, banners, bags, and containers.

A sheet of material may be integrally incorporated into an article. As part of the article, the sheet of material may form a wall, panel, sleeve, pocket, or other feature of the article. The article may include multiple different sheets of material at which a mounting system may be attached, as well as multiple different locations on each sheet of material at which a mounting system may be attached.

In embodiments, an article in which a sheet of material is included may have an inner region and an outer region separated by the sheet of material. The inner region may be at least partially enclosed by the sheet of material, while the outer region is not enclosed by the sheet of material. For example, a shirt may include an inner region in which a body of a user is configured to be placed when the shirt is worn by the user, while an outer region in this example would include an external area from which the sheet of material protects the body from precipitation, light, or other environmental elements. Protection from environmental elements need not be a main function of the article in which sheet of material is incorporated, which may be designed for other purposes, including the specific support and placement of a camera or other object on a body of a user. In embodiments, the inner region may receive a first plate and an outer region of the article may receive a second plate of a mount. The first plate may be an inner plate, while the second plate may be an outer plate when received or configured to be received in the regions separated by the sheet of material. In other embodiments, a sheet of material may not have a relative inner region and outer region and, instead, may divide an area into a first region and a second region, wherein a first plate may be received in the first region or second region and a second plate may be received in the second region or first region.

FIG. 1 is an illustration of an example embodiment of a mounting system according to various aspects of the present disclosure. Mounting system 100 includes a first plate, a second plate, and object 130. The first plate is an inner plate 110. The second plate is an outer plate 120. The mounting system 100 is configured to releasably secure object 130 to a sheet of material 140. Inner plate 110 and outer plate 120 are components of an example embodiment of a mount according to various aspects of the present disclosure.

As generally shown in FIG. 1, each of these components have at least a generally similar length and width. Though not shown, a length and width of sheet of material 140 may be substantially larger than the corresponding dimensions of the other components, depending on the overall article in which the sheet of material 140 is incorporated. For example, a sheet of material incorporated in a jacket or shirt may have an overall length and width substantially greater than a corresponding length and width of each of a first plate, second plate, or object. inner plate 110, outer plate 120, or object 130. In another example, when a sheet of material is incorporated in a strap of a piece of gear, a length and/or width of the sheet of material may be equal or approximately equal to a length and/or width of one or more of a first plate, second plate, or object. In embodiments according to various aspects of the present disclosure, sheet of material 140 has one or more of a length and width that equals or is greater than a respective length and width of one or more of inner plate 110, outer plate 120, and/or object 130.

FIG. 1 shows a relative positioning of components of mounting system 110 during use in embodiments according to various aspects of the present disclosure. Specifically, securing object 130 to sheet of material 140 involves positioning inner plate 110 on a first side of sheet of material 140. Outer plate 120 is further positioned on a second side of sheet of material 140, opposite the first side. Inner plate 110 and outer plate 120 are placed on opposite sides of sheet of material 140. Object 130 is positioned on a side of outer plate 120 opposite a side of outer plate 120 that is positioned adjacent sheet of material 140. Sheet of material 140 is positioned between inner plate 110 and object 130. Outer plate 120 is positioned between sheet of material 140 and object 130.

In embodiments according to various aspects of the present disclosure, a first plate includes one or more retention structures. The first plate may be an inner plate with the one or more retention structures. The first plate and the one or more retention structures may comprise a rigid, durable material, such as plastic. Each of the one or more retention structures may be supported on a base of the first plate. Each of the one or more retention structures may be integrally connected to the first plate. The one or more retention structures may form a channel along the first plate. Each of the one or more retention structures may be configured to retain a corresponding portion of a second plate. For example, a second plate may be received in a channel provided on the inner plate by the one or more retention structures. Each of the one or more retention structures may include one or more surfaces configured to engage one or more of a sheet of material and a second plate.

In embodiments, a retention structure includes one or more surfaces to engage a sheet of material. The surfaces may include at least one a retention surface. The surfaces may include at least one top surface, positioned at an end of a retention structure distal to an end of the retention structure attached to a base of the inner plate. The surfaces may include at least one locking surface. The surfaces may include at least one channel surface. The one or more surfaces may include at least one end surface.

Two or more surfaces of a retention structure may be variously configured. For example, the surfaces may be perpendicular to each other. The surfaces may be disposed at one of an acute angle, right angle, or obtuse angle to each other. The surfaces may have a rectangular shape. The surfaces may have different dimensions. The surfaces may have a same height or different heights. The surfaces may have a same length or different lengths.

In embodiments, a retention structure is configured to retain a portion of a second plate. The retained portion may be engaged by the retention structure. The retained portion may not be separated from the retention surface. The retained portion may not be moved relative to the retention structure. Neither the retention structure nor the portion of the second plate may include a magnet. The portion of the second plate may be retained independent of or without a magnet being included as part of the retention structure, much less an overall mount that includes the retention structure and second plate. In embodiments according to various aspects of the present disclosure, a mount comprising the retention structure uses geometry to secure an object to a sheet of material, rather than other manners or forms of fasteners, thus making the mount light and secure without requiring that the sheet of material be punctured. When a sheet of material is positioned between the retention structure and the portion of the second plate, the retention structure and the second plate may be retained on the sheet of material.

A retention structure may engage different portions of a second plate separately. For example, the retention structure may be configured to engage different portions of the second plate at different times. The retention structure may engage different portions of the second plate based on different relative orientations between the retention structure and the second plate. For example, a retention structure may only engage either a first portion or a second portion of a second plate, wherein the first portion is not engaged with the retention structure when the second portion is engaged with the retention structure and the second portion is not engaged with the retention structure when the first portion is engaged with the retention structure. The retention structure may engage the first portion of the second plate when the first portion is oriented toward the retention structure and engage a second portion of the second plate when the second portion is oriented toward or facing the retention structure. Each portion of the second plate may have a size or shape that only permits the retention structure to engage the portions separately. For example, a retention structure may have a size or shape that only permits the retention structure to engage two different flanges of a second plate separately and not concurrently.

In embodiments, a retention structure includes a retention surface that is configured to engage different portions of the second plate. The same retention surface may engage the different portions of the second plate. For example, the retention surface may be positioned at a location on the second plate that enables the retention surface to engage respective surfaces of different portions of the second plate, such as a first contact surface on a first portion of the second plate and a second contact surface on a second portion of the second plate. The retention surface may have one or more of a size and a shape that matches or otherwise corresponds to sizes or shapes of the different portions of the second plate. The retention surface may be oriented on the inner plate to engage respective surfaces of different portions of the second plate in accordance with an orientation of the second plate. The retention surface on the retention structure may engage the respective surfaces of different portions of the second plate separately, at different times, and/or based on different relative orientations between the retention surface and the second plate.

In embodiments, a retention structure is configured to engage different portions of the second plate simultaneously. For example, different surfaces of a retention structure may concurrently engage different portions of an outer plate. A retention structure may include a first surface configured to engage a first portion of the outer plate and a second surface configured to concurrently engage a second surface of the outer plate. A retention structure may be configured to engage both a first portion of an outer plate on a first side of the retention structure and engage a second portion of the outer plate on a second side of the retention structure, different and/or opposite the first side. For example, a retention structure may engage another component, such as a second plate, on a retention surface and a channel surface of the retention structure at the same time. The retention structure may engage different portions of the second plate at the same time in accordance with an orientation of a mount.

In embodiments according to various aspects of the present disclosure, a first plate may include one or more locking portions for locking another component to the first plate. The locking portion may engage the other component. The locking portion may include one or more surfaces that engage the other component. The locking portion may prevent the other component from moving in a direction in which the component was configured or enabled to move prior to engaging the locking portion. For example, a first plate may include one or more locking channels for receiving a corresponding portion of the other component. The other component may be locked to the first plate when the corresponding portion of the other component is disposed in the one or more channels. The locking channel may prevent an inserted corresponding portion of the other component from moving in a direction associated with release of the other component from the first plate. A length of a locking channel may be greater than a length of the portion of the other component configured to be inserted or received in the locking channel.

In embodiments, a retention structure includes a locking channel in which a portion of another component may be positioned, received, or inserted. The channel may be one locking portion of the first plate. The locking channel may be inset, disposed below or closer to a center of the retention structure relative to an adjacent surface of the retention structure that is not part of the locking channel. The locking channel may be formed by two or more surfaces of the retention structure, such as one or more locking surfaces and/or one or more channel surfaces. The locking channel may be separate from a channel formed by the retention structure and one or more of a base and at least one other retention structure.

An inserted portion of another component, such as a locking projection, may engage the locking channel on two or more adjacent surfaces of a locking channel. An inserted portion of another component, such as a locking projection, may engage the locking channel on three or more adjacent surfaces of the locking channel. The adjacent surfaces may include at least one locking surface and at least one channel surface. The adjacent surfaces of a locking channel may meet at an angle by which a concave portion is established on the retention structure by the adjacent surfaces.

In embodiments, a locking portion includes a locking surface. The locking surface may engage a portion of another component. The locking surface may block or preclude movement of the other component upon engagement. The locking surface may prevent a portion of another component disposed adjacent the locking surface from being removed in a direction of the locking surface relative to the disposed portion. The blocked direction may be different from a direction from which the other portion may be disposed adjacent the locking surface. For example, a blocked direction of removal for the other portion may be perpendicular to a direction in which the other portion may be received or removed from being disposed adjacent the locking surface.

A locking surface may be disposed at an end of a locking channel closest to a direction in which another component is first received or first engages an inner plate on which the channel is provided. The locking surface may be disposed perpendicular to this direction. The locking surface may prevent movement of the other component in a direction opposite this direction in which the first plate first engaged or received the other component. The locking channel may also include a second locking surface at another end of the channel in this direction, opposite the end closest to the direction in which the other component is first received by the inner plate.

In embodiments, a locking portion includes one or more channel surfaces. A channel surface may define a side of a locking channel or other inset region in which a portion of another component may be received. The channel surface may engage the portion of the other component. The channel surface may be disposed parallel to a direction in which another component may be received by a first plate on which the channel surface is included.

In embodiments, a same locking surface may be used in different relative orientations of components of a mount. For example, a same locking surface may be used in each of a first orientation and a second orientation. The locking surface may be engaged with different other surfaces in each orientation. For example, a locking surface may engage a first end surface of a first locking projection in a first orientation and separately engage a second end surface of a second locking projection in a second orientation. Such an arrangement enables a same locking channel to be used with different locking elements, thereby avoiding additional weight or surface area that might be otherwise necessary for locking each of separate locking elements to a first plate or for locking a second plate to the first plate in different orientations.

In embodiments according to various aspects of the present disclosure, a base of a first plate is a physical support structure on which the one or more retention structures of the first plate are disposed. The base may be planar. The base may interconnect two or more retention structures. One or more of the retention structures may be located along a perimeter of the base. A pair of the retention structures may be located at opposite sides of the base. The base may form a channel along the base, further in combination with the one or more retention structures. The base may engage a second plate. A combination of the base and at least one retention structure may be configured to retain a sheet of material within a mount that includes the base and the at least one retention structure.

In embodiments, a base of a first plate includes a support surface. The support surface may be positioned adjacent a location at which each retention structure is disposed. A channel along the base may be formed in part by the support surface. The support surface of the base may be configured to engage a second plate.

In embodiments according to various aspects of the present disclosure, a first plate includes a retention surface. The retention surface may be disclosed on a retention structure. The retention surface may be disposed on a side of the retention structure opposite a side on which a locking portion of the first plate is provided.

In embodiments, a retention surface is angled toward a support surface of a base. The retention surface may be angled toward a plane in which the support surface of the base is disposed, away from a direction perpendicular to the plate in which the support surface is disposed. The angle may be an acute angle relative to the support surface of the base. The angled retention surface may include a first end adjacent the support surface of a base and a second end distal to the support surface, opposite the first end on the retention surface. Based on the angle and an orientation of the retention surface, an end of the retention surface distal to the support surface of a base on which the retention structure is disposed may be closer to a midpoint of the base than an end of the retention surface proximate the support surface of the base. A direction between the distal and proximate ends of the retention surface may correspond to a height of the retention surface. The retention surface may form a side of a retention structure, such that a direction between these two ends of the retention surface corresponds to a height of the retention structure. The retention surface may be angled in a first dimension, corresponding to a height of a channel formed in part by the retention surface.

In embodiments, two or more such angled retention surfaces may be provided on a same base on an inner plate. The two or more angled retention surfaces may be provided on respective, different retention structures. The two or more retention surfaces may be oriented toward each other, such that a retention surface of each retention structure is a closest surface of the retention structure to the other retention structure. Each retention surface may be symmetrically positioned on the base. Each such retention surface may be positioned symmetrically with respect to a line along a support surface of the base. The line may be a midline along the support surface. The line may be along a length of the base.

Two retention surfaces angled toward each other may establish a channel along a first plate with a dovetail shape. The two retention surfaces may define the channel, further in combination with a support surface of a base on a first plate. The dovetail-shaped channel may be provided between two retention structures on which the retention surfaces are disposed. The dovetail shape may be a trapezoid shape, comprising two parallel sides and two angled sides. The dovetail shape may include an isosceles trapezoid shape. The dovetail shape may include a wedge shape, tapered along two opposing sides.

A dovetail-shaped channel may be angled in a direction away or perpendicular to a support surface of a base of a first plate. The direction may correspond to a height of the channel. An end of the channel adjacent the support surface may be a wider end of the dovetail shape, an end of the channel distal to the support surface may be a narrower end of the dovetail shape, and two retention surfaces may provide tapered sides of the dovetail-shaped channel between the wider end and narrower end. Different cross-sections of the channel along a length of the inner plate may have this dovetail shape, wherein the dovetail shape is provided in planes defined by the height and width of the channel. The narrower ender of the dovetail shape may be open, not defined or enclosed by a support surface or retention surface of the inner plate. The wider end may be closed or at least partially closed by the support surface of the base.

In embodiments according to various aspects of the present disclosure, a retention surface is angled along a support surface of a base. The retention surface may be angled along or parallel to a plane in which the support surface of the base is disposed. The retention surface may be angled in a second dimension, corresponding to a length of a channel formed in part by the retention surface. The retention surface may be disposed at an angle relative to a line along the support surface of the base. The line may be a midline of the support surface, dividing the support surface into two ends. The line may be disposed along a length of the support surface of the base. Different cross-sections of the channel along a height of the inner plate may have this dovetail shape, wherein the dovetail shape is provided in planes defined by the length and width of the channel.

A retention structure with the angled retention surface may be positioned on one side of this line, not dissected or crossed by the line. The retention surface may include a first end disposed closer to the line than a second end of the retention surface, opposite the first end, such that the retention surface is disposed at an angle to the line. The angled retention surface may be provided on one side of a retention structure, while an opposite side may not be angled or be angled differently from the angled retention surface. Based on the angle of the retention surface, the retention structure with the angled retention surface may be tapered. For example, a width of a retention structure may increase or decrease along a length of the retention structure, wherein the retention surface is provided along the length of the retention structure and the length is perpendicular to the width.

Two retention structures with such angled retention surfaces may be disposed on a base. The retention surfaces may be oriented toward each other, establishing a channel. The two retention surfaces may be disposed on opposite sides of a line along a support surface of the base. The line may be along a length of the channel, a length of the base, and/or a length of a support surface of the base. The two retention structures may be disposed on opposite ends of the base separated by the line. The two retention surfaces may be disposed symmetrically about the line, wherein an end of a first retention surface closest to the line is mirrored about the line by an end of a second retention surface that is also closest to the line. In this arrangement, a channel between the retention structures has a dovetail shape along a length of the channel, parallel to the line about which the retention structures are disposed. Two tapered sides of the dovetail shape are defined by the retention surfaces, while a narrower end and a wider end of the dovetail shape may be open.

In embodiments, a channel between two retention surfaces has a dovetail shape in one or more dimensions. The dimensions may be perpendicular to each other. For example, the dimensions may be one or more of a height and a length of the channel. A width of the channel may have a dovetail shape in a direction corresponding to the height of the channel. A width of the channel may have a dovetail shape in a direction corresponding to the length of the channel. The width of the channel may be tapered in one or more directions perpendicular to the width. Multiple cross-sections of the channel may have the dovetail shape, including continuous cross-sections along each of the one or more dimensions. An entire dimension of the one or more dimensions may have a dovetail shape, wherein each cross-section along the dimension has the dovetail shape.

In embodiments according to various aspects of the present disclosure, a channel along a first plate has a dovetail shape in two dimensions. The dimensions may include a height of the channel. The dimensions may include a length of the channel. The channel may be tapered in a direction perpendicular to each dimension along the dimension. For example, a width of the channel may be tapered along a height of the channel. A width of the channel may also be tapered along a length of the channel. The channel may be formed by at least two retention structures. The channel may be formed between at least two retention surfaces. The channel may be formed between at least two retention structures, each retention structure having an angled retention surface.

In embodiments, a retention surface is configured to engage different sets of respective surfaces of a second plate. For example, a first retention surface may be configured to engage a first and second surface of an outer plate, while a second retention surface may be configured to engage a third and fourth surface of the outer plate, wherein each surface is different from the other surfaces. The different sets of surfaces may not include a same surface of the second plate.

In embodiments, each retention structure is configured to engage a common set of portions of another component. Multiple retention structures may each engage each of multiple portions of another component, including in multiple orientations of an inner plate relative to another component of a mount. For example, a first retention structure may be configured to engage a first flange and a second flange of an outer plate, while a second retention structure may also be configured to engage the second flange and the first flange of the outer plate. In this example, the first retention structure may engage either the first flange or second flange in an orientation, while the second retention structure may engage the other flange not engaged by the first retention structure in the orientation.

In embodiments, each retention structure of a first plate is configured to engage a different part of a common portion of a second plate. For example, a first retention structure may be configured to engage a first end of a first flange while a second retention structure is configured to engage a second end of the first flange, different from the second end. As noted above, the first retention structure and second retention structure may be configured to engage the first flange separately, at different times, and/or in accordance with different respective orientations between the second plate, first retention structure, and second retention structure.

A pair of retention structures may be positioned symmetrically along a first line, but asymmetrical about a second line. The second line may be perpendicular to the first line. The first line may be a midline, evenly dividing a portion of a first plate, such as a support surface or a base of the first plate. The first line may be along a length of the first plate, while the second line may be along a width of the first plate. For example, a pair of the multiple retention structures may be symmetrically configured about a first axis parallel to a base of an inner plate and asymmetrically configured about a second axis parallel to a surface of the base.

In embodiments, a channel of a first plate may receive another component of the mount from a limited set of directions. The limited set directions may be based on a tapered or dovetail shape of the channel, wherein a size of one or more dimensions of the channel prevents the other component from being received in directions other than the limited set of directions. The directions may include a single dimension. By limiting a direction from which another component may be received in a channel, a selective or relative orientation between a first plate with the channel and the other component may be enforced. A limited direction of reception between two components of a mount may also increase the strength of the assembled mount, further preventing the components of the mount from being disassembled.

Another component may be released from a channel by moving the component in a direction opposite from that in which it was received in the channel. The opposite direction may be parallel to a direction in which the other component was retained in the channel upon engagement with one or more retention structures. A direction of release may also be parallel to a surface of a base of an inner plate in which the other component was retained.

In embodiments according to various aspects of the present disclosure, a mount includes a second plate. The second plate may be an outer plate. The second plate may comprise different portions including a base, one or more portions for retaining, and one or more portions for coupling. The second plate may be retained by a first plate of the mount, including with a sheet of material disposed between the second plate and first plate. The second plate may be retained by the first plate using geometry, rather than magnets or magnetic forces. The second plate may also be securely coupled to an object. The second plate may have a size related to a size of a first plate in the mount, including one or more of a width equal or greater than a width of the first plate and a length equal to or less than a length of the first plate.

In embodiments according to various aspects of the present disclosure, a second plate includes a base. The base may be planar. The base may provide a physical support structure for one or more other portions of a second plate. The base may be rigidly or adjustably connected to another portion of the second plate. For example, a first portion of the second plate may be fixedly connected to the base, while a second portion of the second plate may be moveably or pivotably connected to the base. The base may rigidly interconnect two or more other portions of the second plate. Another portion of the second plate may be disposed at a center of the base. The base may include one or more support surfaces, wherein each support surface of the base may engage another component, such as an object. The base may include multiple sides. The base may include different connected to different types of other portions of the second plate. Pairs of other portions of the second plate may be connected to the base at opposite sides of the base. Pairs of other portions may be symmetrically positioned on the base. One or more other portions of the second plate may be located along a perimeter of a side the base. The base of an outer plate may be configured to be spaced, isolated, or physically separated from a first plate, wherein one or more other portions of the second plate engage the first plate rather than the base of the second plate. In other embodiments, a combination of the base and one or more other portions of the second plate may each engage a first plate, rather than the other portions alone.

In embodiments according to various aspects of the present disclosure, a second plate includes portions for retaining the second plate to a first plate. The retention may include the inability to physically separate the first plate and these portions of the second plate. When retained on the first plate, the portions for retaining may not be moved relative to the first plate.

In embodiments, a second plate includes portions for retaining a second plate to a first plate using geometry. The portions for retaining do not include a magnet, are not magnetic, and are configured to be retained by the first plate independent of inclusion of a magnet in a first plate or second plate of a mount. Rather, sizes and shapes of the portions for retaining enable the second plate to be retained on the first plate. The portions for retention may include one or more locking elements. The portions for retention may also include one or more flanges.

In embodiments according to various aspects of the present disclosure, the second plate includes a locking element. The locking element may be configured to lock the second plate to the first plate. The locking element may include an upper side, configured to be disposed adjacent an object. In a locked position, the upper side may be placed flush with a support surface of a base of the second plate. The locking element may include a locking side, configured to be disposed proximate the first plate and including one or more surfaces to engage the first plate. The locking element may also include an inner side, disposed proximate and oriented toward a base of the second plate.

In embodiments, the locking element is configured to be actuated. The locking element may have a locked position and an unlocked position. The locking element may be actuated between the locked position and the unlocked position. The locking element may be actuated by rotation of the locking element. The locking element may pivot about a base of a second plate. The locking element may pivot about an axis in a first direction to a locked position. The locking element may pivot about an axis in a second direction to an unlocked position. The same axis may be associated with both pivoting the locking element to the locked position and to the unlocked position. The first direction may be opposite the second direction. The locking element may be actuated in one or more directions that are perpendicular to a direction in which the second plate may be attached to a first plate or received by a first plate.

In other embodiments, a locking element may be actuated between a locked position and an unlocked position in a different manner. Actuation may include movement, such that the locking element is moveable between the locked position and the unlocked position. For example, the locking element may slide along an axis between a locked position at a first location on the axis and an unlocked position at a second location on the axis. The locking element may also move in multiple directions between the locked position and the unlocked position. For example, a locking element may both slide and rotate between and about separate locations on two different axes. A locking element may also slide along or rotate about each of two different axes between locked and unlocked positions. The locking element may be actuated in accordance with two or more axes of motion.

In embodiments, the locking element may be a locking arm. The locking arm may have a proximal end at which the arm is moveably connected to a second plate. The locking arm may have a distal end, opposite the proximal end. The proximal end and distal end of the locking arm may be connected by an elongated portion of locking element. The locking arm may be disposed along a width of the second plate. The locking arm may be disposed with a proximate end near a midline of a base of the second plate and a distal end positioned away from the midline along a width of the base of the second plate.

In embodiments, a locking element may have an arcuate or wing-like shape. An arcuate shape may include two end portions configured to be placed adjacent a base of the second plate. The arcuate shape may include a middle portion configured to be spaced away from a base of the second plate, wherein a space may be provided between the base and the middle portion. The end portions may be provided on opposite sides of the middle portion. The middle portion may define the arcuate shape between the two end portions of the locking element. The middle portion may have an angled shape corresponding to a shape of the base. The shape may enable the locking element to be adjustably positioned about a circumference or perimeter of a base of the second plate. The locking element may be rotated about the circumference or perimeter of the base. The locking element may be positioned co-planar with the base about the circumference or perimeter of the base. The co-planar position for the locking element may correspond to a locked position for the locking element. In an unlocked position, the middle portion of the locking element may be spaced away from the base. The arcuate shape may be provided along a length of the locking element. The arcuate shape may be provided along a direction parallel to an axis of rotation of the locking element. The arcuate shape may be symmetrical along the length of the locking element and symmetrical about a width of the locking element.

A locking element may be pivotally connected to the second plate via a pin. The pin may define a pivot axis or an axis of rotation for the locking element. A proximal end of the locking element may include a bore in which the pin may be inserted.

Different portions of a locking element may be connected to one or more pins. For example, different ends of the locking element may be pivotally connected via separate, different pins. Multiple separate pins may extend through multiple separate portions of a locking element. Each pin may be disposed along a same axis of rotation for the locking element. Each separate pin may interconnect different portions of a base of a second plate and the locking element.

In other embodiments, a single pin may engage first and second ends of locking element. A single pin may extend through lengths of a first portion of a locking element, a base of an outer plate, and a second portion of the locking element. The single pin may establish a common pivot axis for one or more portions of the locking element.

A locking element may be connected to a second plate at more than one location on the second plate. For example, the locking element may include two proximal ends, each connected to a base of the second plate. The proximal ends may include end portions of the locking element. The locking element may include a distal end that interconnects the two proximal ends. The distal end may include a middle portion of the locking element. The distal end may be positioned or moved away from the base while remaining connected to the base via the two proximate ends of the locking element.

In embodiments, a locking element is connected to a second plate at a location. The location may be on a base of the second plate. The location may be on a side of the base of the second plate. The location may be on a side of the base of the second plate different from another side on which another portion of the second plate is connected to the base. For example, the locking element may be connected to a side of the base of the second plate that is different from a side of the base at which another portion for retaining the second plate is connected to the base, such as a flange. The location may be on a side of the base of the second plate that is perpendicular to another side on which another portion of the second plate is connected to the base.

A locking element may include one or more surfaces configured to engage a first plate. The locking element may be in a locked position when the one or more surfaces are engaged with the first plate. The surfaces may include one or more end surfaces. The surfaces may include one or more side surfaces. The surfaces may protrude from another surface of the locking element. The one or more surfaces may be positioned on a locking side of the locking element. At least one of the surfaces may be positioned perpendicular to a direction at which a second plate may be attached to the first plate or received by the first plate. At least one of the one or more surfaces may be positioned on a locking projection.

In embodiments, a locking element includes a locking projection. The locking projection may provide a physical structure that may inserted into a channel, inset region, or concave region of another component to which a first plate is to be locked. The locking projection may be connected on a locking side of the locking element. The locking projection may be a tab. The locking projection may be rectangular in shape. The locking projection may be rigid. The locking projection may be disposed in a fixed position and fixed orientation on locking element. The locking projection may be durable, able to repeatedly engage another component. The locking projection may repeatedly engage another component with a compression force or other force, yet not degrade, deform, or otherwise lose the ability to lock the first plate to the other component. The locking projection may have a length and a width. A length of the locking projection may be greater than a width of the locking projection, enabling a larger surface of the locking projection to engage a sheet of material in each of at least two orientations of a first plate relative to a second plate.

A locking projection may also include one or more surfaces configured to engage one or more corresponding portions of another component. The one or more surfaces may include one or more end surfaces of the locking projection, disposed along a width of the locking projection. The one or more surfaces may also include a side surface of the locking projection, disposed along a length of the locking projection. The one or more surfaces may also include a distal surface, disposed at an end of the locking projection opposite an end at which the locking projection is connected to the locking element. The distal surface of the locking projection may be disposed in a plane defined by the length and width of the locking projection. When engaged, the one or more surfaces may prevent movement of the locking protrusion and the locking element in one or more directions of the corresponding portions relative to the one or more surfaces of the locking projection.

A locking projection may be connected at a location on the locking element. The location may be on a locking side of the locking element. The location may be centered along a length of the locking element. The location may be on a distal end of the locking element. The location may be away from an end of the locking element at which the locking element is connected to a second plate. The locking projection may be integrally, rigidly, and fixedly connected to the locking element at the location.

A locking element may include two or more locking projections. For example, a single locking element may include multiple locking tabs, each at a different location on the locking arm. Each of the locking projections may be provided on a same side of the locking element. The locking projections may be provided on a same end of a locking element. The locking projections may be positioned symmetrically or asymmetrically on a locking element. The locking projections may have different sizes, shapes, and orientations. One or more of the locking projections may be positioned along a locking element between a proximal end and a distal end of the locking element.

In other embodiments, a locking projection may not be included as part of a locking element. For example, a locking element may include a locking channel, inset portion, or cavity into which a corresponding portion of an inner plate may be positioned, inserted, or otherwise engage the locking element.

In embodiments, a locking projection or other type of fastener may not be provided on a locking element. In these embodiments, a locking element may rely on another component, separate from the locking element itself to lock an outer plate that has been engaged with an inner plate. The locking element may also rely on a surface of the locking element itself, rather than one or more surfaces on an inset or extended portion of the locking element, such as a locking protrusion.

In embodiments, a second plate may include two or more locking elements. The locking elements may be positioned on different sides of the second plate. The locking elements may be positioned on opposite sides of the second plate. The locking elements may be connected to one or more same sides of the second plate. An axis of rotation for each locking element may be disposed parallel to each other. Each locking element may be positioned co-planar or at least partially co-planar with a base of the second plate in a locking element. Each locking element may be actuated between a locked position and an unlocked position in different directions. For example, a first locking element may be actuated to a locked position in a first direction and a second locking element may be actuated to a locked position in a second direction, opposite the first direction. Each locking element of the locking element may be actuated separately. Each locking element of the locking element may be actuated independently of another locking element. The second plate may be locked to another component when at least one of the locking elements is in a locked position or when all locking elements are in respective locked positions.

In embodiments, a same locking element is configured to lock an outer plate to an inner plate in each of multiple orientations. For example, a first locking element may be configured to lock an outer plate to an inner plate in each of a first orientation and a second orientation. A second locking element may be configured to lock the outer plate to the inner plate in each of a second orientation and the first orientation. A same locking element may be configured to lock an outer plate to an inner plate in each of multiple orientations based on a shape of the locking element, which may include a symmetrical shape. A same locking element may also be configured to lock an outer plate to an inner plate in each of multiple orientations based on a relative position of the locking element, which may include a position of the locking element relative to a contact surface associated with each of the orientations.

In embodiments according to various aspects of the present disclosure, a second plate includes a flange. A flange may be a physical structure by which a second plate is physically attached to another component, such as a first plate. The flange may be rigid and fixedly integrated with a base of an outer plate. The flange may engage or may be configured to engage a corresponding portion of the other component. The flange may be positioned on the second plate to engage the corresponding portion of the other component. An orientation of the flange may be provided to enable one or more surfaces of the flange to engage the corresponding portion of the other component. A shape of the flange may be selected to enable the flange to engage the corresponding portion of the other component. A configuration of the flange may accommodate placement and retention of a sheet of material between the flange and the other component. The flange may be configured to engage the other component when a sheet of material is positioned between the flange and the inner plate.

In embodiments, a flange protrudes from a location on a base of the second plate. The location may be on a side of the base opposite a side at which a portion for coupling is disposed on the base. The location may be different from a location at which one or more other portions for retaining, such as a locking element, may be connected to the base. The location may be on a surface of the base opposite a support surface of the base. The flange may fully protrude from the location on the base, such that each surface of the flange extends beyond a surface of the base. The flange may extend beyond an end of the flange from the location, protruding away from the end in two or more perpendicular directions.

In embodiments, a flange may extend from a perimeter of a second plate. The flange may extend along an entire perimeter of the second plate. The flange may extend along an entire edge of the second plate. The flange may extend from a subset of an edge along the perimeter, wherein the edge at the perimeter includes one or more locations from which the flange is not connected and/or does not extend.

A flange may be disposed at an angle from a base. One or more sides of the flange may extend at one or more different angles from the base relative to a plane associated with a surface of the base. One or more sides of the flange may extend at one or more different angles relative to a common plane defined by a surface of the base. One or more sides of the flange may extend away from a midpoint of the base, wherein the midpoint of the base may include a midpoint of one or more of a width and length of the base. One or more sides of a flange may extend away at an obtuse angle from a midpoint of the base, the angle defined by a surface of each side and surface of the base between the side and a midpoint of the base. One or more sides of a flange may extend at a common angle relative to a surface of a base. In embodiments, three or more different sides of the flange may extend at two or more different angles relative to a common surface of the base.

In embodiments, a flange shape has two or more sides disposed in a wedge shape. The flange may taper between a first end and a second end in the wedge shape. The flange may taper, decrease in width, or narrow in directions perpendicular to a direction between a first end and a second end of the flange. The first end may be connected to or adjacent a surface of a base and the second end may be distal to the surface.

A flange may include at least one inner side, facing a center of a surface on which the flange is disposed and/or a surface of a base adjacent the flange. Each inner side may be angled away from a midpoint of the base. Each inner side may not be configured to engage a sheet of material. Each inner side may correspond to a tapered side of a wedge shape of the flange.

A flange may also include one or more outer sides. Each outer side may be positioned on a flange at a location opposite a side on the flange closest to a midpoint of a base. Each outer side may be angled away from a midpoint of the base. Each outer side may be configured to engage a sheet of material. Each outer side may have a smooth surface. Each outer side may correspond to a tapered side of a wedge shape of the flange. Each outer side may include a contact surface of the second plate.

A flange may also include one or more distal sides, located on the flange at an end opposite to an end at which the flange is connected to a second plate. Each distal side may include at least one guide surface. Each distal side may be disposed parallel to a surface of a base of a second plate. Each distal side may be located at a narrow end of a wedge shape of the flange.

A guide surface in a flange may be configured to engage a surface of another component. The guide surface may be configured to engage a surface of another component and a sheet of material disposed between the other component and the guide surface. For example, a guide surface may engage a support surface of a base of a first plate. The guide surface may be configured to slide along a surface of another component, such as a support surface of a first plate. The guide surface on a first flange may be co-planar with another surface on a second plate, such as another guide surface.

In embodiments, a second plate includes two or more flanges, each configured to engage a corresponding portion of another component, such as a first plate. The two or more flanges may be interconnected by a base of the second plate. The two or more flanges may be positioned symmetrically on the second plate. The two or more flanges may be positioned on a same side of the second plate. The two or more flanges may be positioned on a same surface of the second plate. The two or more flanges may be separated by other portions of the second plate, such as a base of the second plate. The two or more flanges may be positioned at opposite ends of the base, the ends defined by a midline extending along a length of the second plate. The two or more flanges may be provided symmetrically about the midline of the second plate. The two or more flanges may extend in opposite directions from the midline. In other embodiments, the two or more flanges may protrude from different sides or different surfaces of the plate. The two or more flanges may each be located along a perimeter of the base of an outer plate. The two or more flanges may include one or more pairs of outer sides, each flange including one of the outer sides in each pair and each pair of outer sides having a tapered shape in one or more dimensions. The two or more flanges may have two pairs of outer sides, each flange having one outer side in each pair and each pair having a tapered shape in two dimensions.

In embodiments, a second plate includes a cavity defined by two or more flanges. The cavity may be formed along the second plate between the two or more flanges. The cavity may be formed adjacent a surface of a base of the second plate. The cavity may receive a non-planar feature of a sheet of material upon retention of the second plate on the sheet of material. Such a cavity enables the second plate to be retained at a location of a button, seam, wrinkle, or other feature present on a sheet of material to which the second plate may be retained.

In embodiments, according to various aspects of the present invention, a second plate includes a contact surface. The contact surface is configured to engage a portion of another component. For example, a contact surface may be configured to engage a retention surface of a first plate. Engagement between the contact surface and the portion of the other component may attach a second plate to the other component. Such engagement may prevent the outer plate from being separated from the other component in a direction corresponding to a direction of the other portion of the other component relative to the contact surface. The contact surface may be shaped, oriented, and/or positioned to be disposed within a channel or other concave region provided on the other component.

In embodiments, a second plate includes two or more contact surfaces. Each contact surface may be associated with a different material thickness. Each contact surface may be configured to engage a same portion of a first plate. Each contact surface may be configured to engage the same portion of a first plate at different times. For example, a retention structure on a first plate may be configured to separately engage either a first contact surface or a second contact surface. The retention structure may only engage either contact surface separately and at different times in accordance with an orientation between the outer plate and first plate, even though both contact surfaces are configured to engage the retention structure. Each contact surface may be configured to engage a common portion of another component, even though only one contact surface may engage the common portion of the other component at a time. Each contact surface may have dimensions, a shape, relative angle, relative orientation or other properties that enable the contact surface to be engaged with the common portion of the other component, independent of a specific orientation in which the second plate is disposed. The orientation of the second plate relative to other component determines which contact surface among the two or more contact surfaces actually engages the other component to retain the mount in a sheet of material. The inclusion of multiple such contact surfaces enables a same mount to be retained on multiple sheets of material in multiple orientations, each contact surface engaging the sheet of material and another component of the mount at a time. For contact surfaces associated with multiple material thicknesses, the different orientations enable a same mount to be adjustably retained on multiple sheets of material, each with multiple, different material thicknesses in accordance with a relative orientation between components of the mount, including another component of the mount and the two or more contact surfaces.

In embodiments, a second plate includes two or more contact surfaces on a same flange. For example, two contact surfaces may be disposed on each of two different outer sides of a flange. The two or more contact surfaces may be provided on different ends of an outer plate. The two or more contact surfaces may also be positioned in different radial directions relative to a center of a base. For example, a first contact surface may be positioned in a different radial direction from a second contact surface, ninety degrees apart. Each of the two or more contact surfaces may be oriented or facing a different direction relative to a center of the second plate. The second plate may be attached to another component when at least one of the contact surfaces is engaged with the other component. The second plate may be attached to another component when two or more contact surfaces are engaged with the other component.

Two or more contact surfaces on a same flange may be different. For example, two or more contact surfaces may have one or more different dimensions. The dimensions may include one or more of a height and a length of each contact surface. A first contact surface may have a first length and a second contact surface may have a second length, wherein the first length is less than or shorter than the second length. The two or more contact surfaces may also have a same dimension, such as a same height. A pair of contact surfaces on a same flange may have a pair of respective same dimensions and a second pair of respective different dimensions. For example, two contact surfaces may have a same height, but different respective lengths. In other examples, two or more contact surfaces may have different heights and same or different lengths.

Two or more contact surfaces on different flanges may be different. For example, two contact surfaces on different flanges may have one or more different dimensions. The dimensions may include one or more of a height and a length of each contact surface. A first contact surface on a first flange may have a first length and a second contact surface on a second flange may have a second length, wherein the first length is less than or shorter than the second length. A pair of contact surfaces on different flanges may have a pair of respective same dimensions, while a second pair of respective dimensions is different. For example, two contact surfaces may have a same height, but different respective lengths. Each of the different contact surfaces may be configured to engage a same portion of another component. The different contact surfaces may be associated with different orientations of the mount. The two or more contact surfaces may also be positioned in different radial directions relative to a center of a base, including opposite radial directions. For example, a first contact surface may be positioned in a different radial direction from a second contact surface, one-hundred eighty degrees apart. A second plate may be reversible between an orientation associated with a first contact surface and an orientation associated with a second contact surface. The different flanges may have two pairs of different contact surfaces, such that each flange has two contact surfaces, each of which is different from a contact surface on the other flange.

Two or more contact surfaces on different flanges may also match. For example, two contact surfaces on different flanges may have one or more same dimensions. The dimensions may include one or more of a height and a length of each contact surface. A first contact surface on a first flange may have a first length and first height and a second contact surface on a second flange may have a second length and second height, wherein the first length and first height are equal to the second length and second height. Each of the dimensions between the two or more contact surfaces may be the same. The two or more contact surfaces may have different positions and be facing different directions on a second plate, but same dimensions. The two or more contact surfaces may be symmetrically positioned on a second plate via the different flanges. Each of the different contact surfaces may be configured to engage different portions of another component. For example, each contact surface may be configured to engage different retention structures of a first plate. The two or more contact surfaces may be associated with a same relative orientation of components of a mount.

In embodiments according to various aspects of the present disclosure, a contact surface is associated with a thickness of a sheet of material. A mount including the contact surface may be retained on a sheet of material with the associated material thickness when the contact surface is disposed in an orientation to engage another component of the mount. The thickness may be associated with the contact surface in accordance with one or more properties of the contact surface. The properties may include one or more dimensions of the contact surface. For example, a contact surface with a longer length may enable the contact surface to engage a greater length of a sheet of material compared to a contact surface with a shorter length. The greater length of engagement may be more suitable, necessary, effective, or otherwise selected to engage a thick or thicker sheet of material. The shorter length of engagement may be more suitable, necessary, effective, or otherwise selected to engage a thin or thinner sheet of material. As such, the contact surface with the longer length may be associated with a thicker thickness of material while the contact surface with the shorter length is associated with a different, thinner thickness of material.

The properties may also include a location of the contact surface relative to other portions of an outer plate. The location may include a relative location between the contact surface and a locking element. For example, a contact surface closer to a corresponding end surface of a locking element for the contact surface may be associated with a thicker thickness than a second contact surface that is located at a relatively larger distance away from a corresponding end surface of a locking element for the second contact surface. The differences in distances may correspond to differences in height at which an outer plate may be locked to a first plate, leading to the contact surface with the shorter distance to be associated with a thicker thickness of material while the contact surface with the longer is associated with a different, thinner thickness of material. Such properties are merely examples, wherein other embodiments may include other differences in properties between contact surfaces that enable, configure, or cause the contact surfaces to be associated with different material thicknesses. For different contact surfaces, different material thicknesses may be associated with each contact surface based on differences in one or more properties of the different contact surfaces.

In embodiments according to various aspects of the present disclosure, a second plate includes one or more portions for coupling the second plate to an object. The second plate may be an outer plate. The one or more portions for coupling may be disposed on a support surface of a base of the second plate. At least one of the portions for coupling may be disposed at a center of a base of the second plate. The one or more portions for coupling may be disposed on different sides of a base on a second plate relative to sides at which portions for retaining are disposed on the base. The one or more portions for coupling may rely on geometry and physical forces to couple the second plate to the object, rather than magnets and magnetic forces. For example, the second plate may include a coupler.

A coupler is configured to securely connect an object to another object. The coupler may be a first coupler. The coupler may be a mechanical coupler. The coupler is shaped to engage another element. The other element may be a second coupler. The second coupler may be disposed on the other object to which the second plate is configured to be secured via the coupler. The object and the other object may be securely coupled via engaging the first coupler and second coupler. The coupler may be a receiver, configured to receive a key or other form of latch. The coupler may be at least part of a mechanical fastener. In other embodiments, the coupler may be a key, configured to be inserted into a second coupler comprising a receiver.

In embodiments, an outer plate comprises one or more rigid materials. The rigid materials may include one or more plastic or metal materials, including combinations of these materials. For example, locking elements of an outer plate may include a plastic material, while a base of the outer plate may include a metal pin or other portions that include metal.

FIG. 2 is an illustration of a side view of an example embodiment of a mounting system according to various aspects of the present disclosure. Mounting system 200 includes a first plate, a second plate, and a coupler 232 integrated with object 230. The first plate is an inner plate 210. The second plate is an outer plate 220. Inner plate 210 and outer plate 220 are components of example embodiments of a mount according to various aspects of the present disclosure. Inner plate 210 and outer plate 220 are configured to be positioned on opposite sides of sheet of material 240 to which object 230 may be secured via the inner plate 210, outer plate 220, and coupler 232.

In system 200, inner plate 210 includes a first retention structure 212 and a second retention structure 214. First retention structure 212 includes a first retention surface 216 and second retention structure 214 includes a second retention surface 218. Each retention structure 212, 214 is configured to engage corresponding portions of outer plate 220. Each retention surface 216,218 is configured to engage a respective surface of different portions of outer plate 220. The outer plate 220 may be retained to the inner plate 210 via the retention structures 212,214.

Inner plate 210 also includes a base 254. Base 254 is planar. First retention structure 212 is positioned at an end of base 254 opposite second retention structure 214. Base 254 provides rigid support and interconnection between the retention structures 212 and 214. Base 254 includes a support surface 256. Support surface 256 is located on a same side of base 254 as retention structures 212, 214. First retention surface 216 is positioned adjacent an opposite side of support surface 256 from second retention surface 216. A channel is formed along inner plate 210 via retention surface 216, support surface 256, and retention surface 218. The channel is formed between retention structures 212, 214 by retention structures 212, 214. First retention structure 212 and first retention surface 216 are provided at an opposite end of a width of base 254 and inner plate 210 from second retention structure 214 and second retention surface 218.

Retention structure 214 extends a distance 250 above contact surface 254. Distance 250 is disposed in a direction corresponding to height of retention structure 214. Retention structure 212 extends to a same distance above contact surface 256 as distance 250. In embodiments, retention structures may also extend to different heights above a common reference surface.

Retention surfaces 216, 218 are each angled toward support surface 256. An angle formed between a plane in which support surface 256 is disposed and a plane in which retention surface 216 is disposed may be equal to or different from an angle formed between the plane of support surface 256 and a plane in which retention surface 218 is disposed. Each angle may be an acute angle. In some embodiments, each angle between a retention surface and support surface may be between eighty and forty-five degrees, between seventy and fifty degrees, between sixty-five degrees and fifty-five degrees, and sixty degrees. Each of the retention surfaces 216,218 are disposed at sixty degrees relative to support surface 256.

As shown in FIG. 2, retention structure 212 and retention structure 214 define a channel with a dovetail-shape. A wider end of the channel is provided adjacent support surface 256 of base 254 of inner plate 210. Angled sides of the channel are provided by retention surfaces 216,218. A narrower end of the channel is open. These ends and sides collectively provide the channel with a dovetail shape. The channel is tapered in a direction perpendicular from support surface 256 of the base 254. The channel tapers inward toward a middle of support surface 256 as a distance away from support surface 256 in this direction increases.

Retention structure 212 and retention structure 214 also provide the channel with a dovetail shape along the support surface 256 of base 254. Sides of each retention structure 212,214 that include retention surfaces 216,218 are angled inward toward a midpoint of a width of support surface 256, the midpoint corresponding to a midline along the support surface 256 in a direction of a length of the base 254. Both a wider end and a narrower end of this dovetail shape for the channel are open and adjacent support surface 256. Retention surfaces 216,218 define the angled or tapered sides for this dovetail shape of the channel. The channel is tapered in a direction parallel to support surface 256 of the base 254, between retention surfaces 216,218. The channel tapers inward toward a middle of support surface 256 as a distance along a retention surface 216 or 218 from one end of the retention surface 216 or 218 to the other end of the surface 216 or 218 increases.

The channel between retention structures 212,214 has a dovetail shape along two dimensions of inner plate 210. The two dimensions are a height perpendicular to surface 256 and a length parallel to surface 256. Angled or tapered portions of each dovetail shape are both provided by retention surfaces 216,218, which are angled relative to support surface 256 in two dimensions. A width of the channel decreases along each of these dimensions. Such a shape enables a distance between retention structures 212,214 and portions of outer plate 220, such as flange 226, to decrease as these portions of outer plate 220 are further received into the channel between retention structures 212,214. Eventually, and in accordance with the decreasing widths and distances, the portions of the outer plate 220 engage with portions of sheet of material 240 and inner plate 210, thereby enabling inner plate 210 and outer plate 220 to be retained on the sheet of material 240.

Outer plate 220 includes locking element 222 and a base 228. The locking element 222 includes a locking projection 224. The locking projection 224 is integrated with locking element 222. Outer plate 220 is connected to locking element 222 on opposite sides of base 228. Outer plate 220 is connected to locking element 222 proximate a midpoint of a width of base 228, the midpoint corresponding to a midline of the base 228 and outer plate 220 in a direction corresponding to a length of the base 228 and outer plate 220.

Locking element 222 is illustrated in FIG. 2 in a locked position for outer plate 220. Locking element 222 is a locking arm. In the locked position, locking element 222 is disposed co-planar with base 228. Locking element 222 has a same thickness as base 228 in a direction corresponding to a height of base 228. An upper surface of locking element is flush with a support surface of base 228. In other embodiments, an upper surface may be positioned below a support surface of a base, closer to a center of a base than the upper surface in a direction corresponding to a height of the base. Locking element 222 includes locking projection 224 at an end distal to a center portion of base 228 at which locking element 222 is moveably coupled to base 228.

Locking projection 224 is integrally coupled to locking element 222. Locking projection 224 is disposed in a fixed position and fixed orientation on locking element 222, though other embodiments may include a locking projection with a position and/or orientation that may be adjustable on a locking element. Locking projection 224 is rigid. Locking projection 224 is durable and may repeatedly and separately engage each of retention structure 212 and retention structure 214 in accordance with an orientation of outer plate 220 relative to inner plate 2.

Locking projection 224 is a locking tab, though other locking projections may take other forms. As shown, locking projection 224 protrudes below locking element 222. Locking projection 224 is disposed on and protrudes from a locking side of locking element 222. When the locking element is disposed in a locked position, locking projection 224 protrudes from locking element 222 on a same side of outer plate 220 at which flange 226 is disposed on base 228. In a locked position, locking projection 224 may extend a same distance 252 to which flange 232 extends from base 228. In other embodiments, a locking projection may extend a different distance to which a flange or other retention element extends from a base of an outer plate.

Outer plate 220 includes a flange 226. The flange 226 is positioned on a same side of base 228 at which a locking projection 224 is disposed when the locking projection 224 is actuated to a locked position. The flange 226 is disposed at an end of base 228. The end corresponds to an end of the base 228 in a direction corresponding to a width of the base 228. Flange 226 is positioned along an edge on a side of base 228. Flange 226 protrudes a distance 252 from a surface of base 228. Distance 252 is provided in a direction corresponding to a height of the flange 226. The distance 252 is equal to a distance 250 to which retention element 214 extends from a surface 256 of inner plate 210. In other embodiments, a distance of extension of a locking projection may be greater than a distance associated with a height of a corresponding retention structure. For example, a distance of extension may be greater than a distance of retention structure by 0.5 millimeters or less, 1 millimeter or less, or 2 millimeters or less. Such equality or differences in distances may make placement of an outer plate into a channel on an inner plate easier, including when a sheet of material is placed between these components of a mount. Such equality or differences in height may also ensure that a flange with multiple contact surfaces may be received along an entire length of a channel on an inner plate, avoiding contact between other parts of the outer plate and inner plate.

Flange 226 includes at least two outer sides, as well as an inner side. As generally shown, these sides provide the flange 226 with a wedge shape. A wider end of this wedge shape is proximate base 228, while a narrower end of this wedge shape is distal to base 228. A distal or narrower end of the flange 226 at a distal side is planar, conforming to a shape of support surface 256 of the inner plate 210. A positioning, shape, and orientation of flange 226 establishes a cavity on a same side of the base 228 on which the flange 226 is provided.

As illustrated, base 228 is planar. Base 228 includes a first side on which a pair of flanges are disposed, including flange 226. Base 228 also includes a second side to which a locking element 222 is pivotally connected. These first and second sides are perpendicular to each other.

Base 228 also includes a first coupler (not shown). The first coupler is provided on a side of base 228 opposite a side on which flanges 226 are disposed. The first coupler is provided on a support surface of the base 228, the support surface configured to engage object 230.

The first coupler is configured to receive second coupler 232. The second coupler 232 is physically integrated with object 230. The second coupler 232 is integrated on a surface of the object 230. Second coupler 232 is rigidly attached to a housing of object 230. In other embodiments, a second coupler may be connected to an object in alternate manners, such as by being provided on a case, holder, or other secondary housing that receives or is otherwise coupled to the housing of the object.

Second coupler 232 is configured to be inserted into the first coupler. Second coupler 232 is a key, configured to interconnected with another coupler that is a receiver. In other embodiments, the second coupler may include other shapes and features. For example, the first coupler may be the key, designed and physically shaped to be inserted into a second coupler disposed on an object, wherein second coupler is a receiver. As shown, a height of second coupler 232 extending away from object 230 may be less than a height of object 230 in this same direction. A height of a second coupler may be selected to minimize a profile of the combined outer plate and object, thereby minimizing an extent to which the object extends or protrudes from a sheet of material to which the object is secured via the outer plate. A height of first coupler is selected to be equal or greater than a height of second coupler 232, enabling object 230 to be placed flush with base 228 via the second coupler 232. To securely couple object 230 to outer plate 220, second coupler 232 is inserted into the first coupler and rotated a predetermined radial direction and distance. Object 230 and coupler 232 are rotated parallel to outer plate 220, about a rotational axis defined by second coupler 232 after it is received by the outer plate 220.

In embodiments according to various aspects of the present disclosure, certain portions of one or both of a first plate and second plate may be alternately or additionally disposed on a different component. Relative positions of certain portions may be switched between a first plate and a second plate. For example, one or more retention structures may be positioned on a second plate. A first plate may include one or more contact surfaces. A second plate may include a locking channel and a first plate may include a locking projection. A coupler may be provided on a first plate. A coupler may be provided on both of a first plate and a second plate. One or more flanges may be disposed on a first plate. A first plate may include one or more locking elements. A retention structure, a flange, and/or a locking element or parts thereof may be provided on each of a first plate and/or second plate. Such portions may retain features or continue to perform one or more functions as described herein, despite being disposed on a different component.

To retain a mount to a sheet of material, a first plate may engage a second plate at one or more locations on the first plate in one or more different manners. The sheet of material may be engaged at one or more locations between different portions, different structures, and different surfaces of the first plate and second plate. The sheet of material may be engaged between one or more pairs of surfaces of the first plate and second plate. The sheet of material may be engaged in one or more different directions between the first plate and second plate. The sheet of material may be engaged at one or more different angles between the first plate and second plate. By engaging the sheet of material between the first plate and second plate, the first plate and second plate may be retained on the sheet of material.

In embodiments, the retention between a first plate and a second plate may be further ensured when an object is coupled to the outer plate. Particularly, the coupled object may prevent movement of one or more locking elements of an outer plate. The movement may be prevented based on a relative position of a surface of the object and each of the one or more locking elements. The movement may be prevented based on a relative size of a surface of the object and each of the one or more locking elements. For example, a surface of an object between a second coupler on the object and an edge of the object may have a dimension that is greater than a distance between a first coupler on the outer plate and an edge of a locking element. The relative sizes may preclude motion of the locking element in a direction toward the object when the object is disposed adjacent the outer plate and coupled via the first and second couplers. The direction may correspond to a direction of motion necessary for the locking element to move from a locked position to an unlocked position, such that the object prevents the one or more locking elements from being unlocked and thus further ensures that a first plate and second plate remain retained on the sheet of material.

Figure 3:
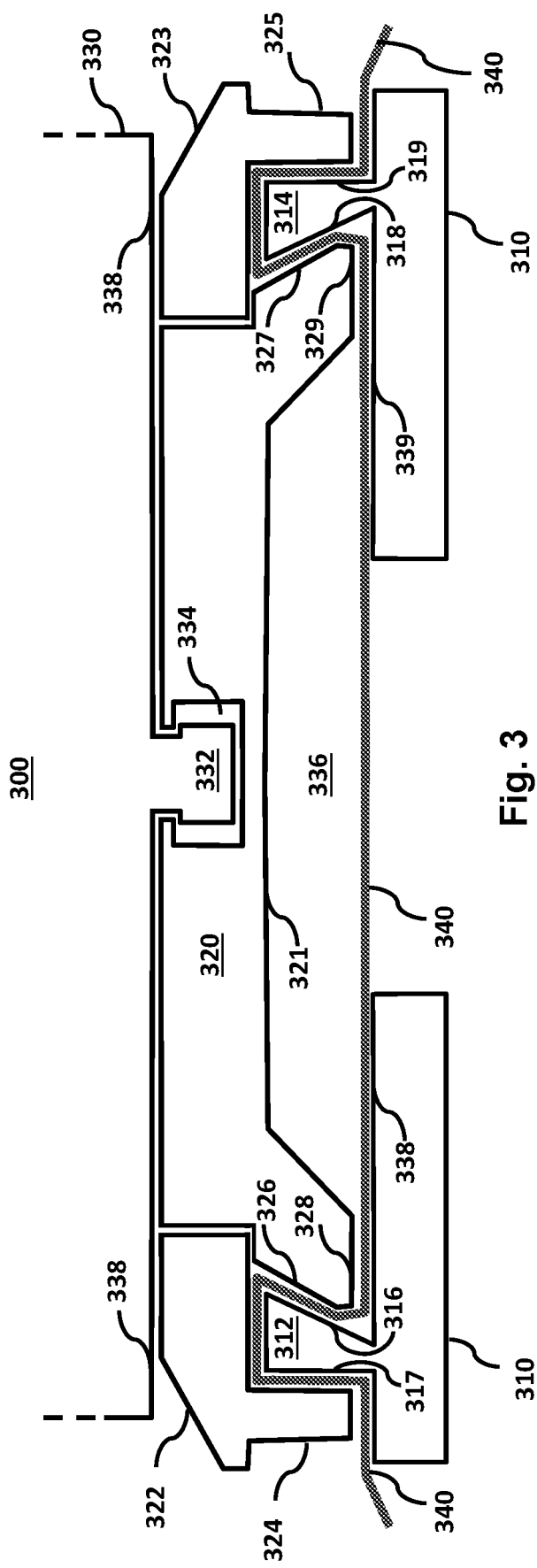
FIG. 3 is an illustration of a cross-section of an example embodiment of a mounting system according to various aspects of the present disclosure.

FIG. 3 is an illustration of a cross-section of an example embodiment of a mounting system according to various aspects of the present disclosure. Mounting system 300 includes an inner plate 310, outer plate 320, and coupler 332. Coupler 332 is integrated with object 330. Mounting system 300 secures object 330 to sheet of material 340 via a mount that includes inner plate 310 and outer plate 320. Object 330 is securely coupled to the mount. Specifically, object 330 is securely coupled to outer plate 320 via coupler 332.

Coupler 332 includes a key. The key includes a post and crossbar. The post and crossbar have a T-shape, wherein a midpoint of a length of the crossbar is connected to a first end of the post. A second end of the post, opposite the crossbar, is connected to object 330. Each connection is rigid and durable, permitting the coupler 332 to withstand rotational, lateral, and other applied forces.

Coupler 334 includes a receiver, inset into a base of outer plate 320. Coupler 332 is configured to connect to outer plate 320 via coupler 334. Coupler 334 has a shape corresponding to a shape of coupler 332. Coupler 334 includes an elongated opening and a chamber. A width and length of the opening of coupler 334 match the width and length of a crossbar of coupler 332, allowing the coupler 332 to pass through the opening and be received in the chamber. The chamber of coupler 334 has a width that is larger than the width of the opening of coupler 334. A length of the chamber of coupler 334 may be equal or greater than a length of the crossbar of coupler 332 and a length of opening of coupler 334.

Coupler 334 is configured to engage coupler 332 via insertion of coupler 332 through the opening of coupler 334, followed by rotation of the coupler 332 once the crossbar of coupler 332 has fully entered the chamber of coupler 334. The coupler 332 is rotated with object 330. The coupler 332 is rotated parallel to a support surface of outer plate 320 on which coupler 334 is disposed, wherein an axis of rotation of the coupler 332 is perpendicular to the support surface of the outer plate 320. After rotation, the crossbar of coupler 332 is not aligned with the opening of coupler 334. The misalignment prevents coupler 332 from being removed from coupler 334 via the opening, thereby securely coupling object 330 to outer plate 320. In embodiments, a coupler may be rotated by ninety degrees to securely couple the coupler within another coupler. After rotation, the object 330 is positioned immediately adjacent surfaces of outer plate 320, including surfaces of locking elements 322,323.

In combination, coupler 332 and 334 form a mechanical fastener in which each coupler 332,334 is part of the mechanical fastener. The mechanical fastener relies on a shape each part of the fastener to join the parts of the fastener together. In other embodiments, other configurations of couplers may be used, including those that involve one or more different shapes, different angles of rotation, and/or different movements for coupling. In other embodiments, other fasteners may be used, including different types of mechanical fasteners and/or additional fasteners.

Outer plate 320 includes locking elements 322, 323. In FIG. 3, the locking elements 322,323 are disposed in locked positions at opposite sides and opposite ends of a base of the outer plate 320. Locking elements 322,323 are disposed symmetrically about a base of outer plate 320. In their respective locked positions, locking elements 322,323 are co-planar with a base of outer plate 320. Such an arrangement enables object 330 to be closely mounted to outer plate 320 and permits object 330 to be rotated parallel to the locking elements 322,323 without interference from either locking element 322,323.

When object 330 is securely coupled to outer plate 320, movement of each locking element 322,323 is prevented. Securely coupled object 330 simultaneously prevents motion of each locking element 322,323 in a direction toward object 330. The direction is associated with moving each locking element 322,323 from a locked position to an unlocked position. The direction toward object 330 from each locking element 322,323 is perpendicular to a direction in which object 330 is moved to secure the object 330 to outer plate 320. The direction associated with unlocking each locking element is also different from and perpendicular to a direction associated with decoupling the object 330 from the outer plate 320. In this arrangement, coupled object 330 increases a number of motions required to unlock elements 322,323 and release outer plate 320 from sheet of material 340, thereby improving the retention of outer plate 320 on sheet of material 340. Particularly, release of outer plate 320 requires both decoupling of object 330 and actuation of locking elements 322,323, rather than the actuation of the locking elements 322,323 alone.

When object 330 is securely coupled to outer plate 320, movement of each locking element 322,323 is impeded by a surface of object 330. Each surface of the object 330 is sized to overhang an upper side of each locking element 322,323 when the object 330 is securely coupled to outer plate 320. Object 330 has a surface with a dimension between coupler 332 and an edge of the object 330 that is greater than a distance between coupler 334 and an edge of locking element 322. Object 330 also has a surface with a dimension between coupler 332 and an edge of the object 330 that is greater than a distance between coupler 334 and an edge of locking element 323. Each surface is on a same side of object 330 as coupler 332, adjacent the coupler 332. Each surface locks a respective locking element 322,323 in a locked position. Each surface blocks motion of a respective locking element 322,323 in a direction associated with an unlocked position for each locking element 322,323. Locking element 322 is engaged on opposite sides by object 330 and sheet of material 340. Locking element 323 is engaged on opposite sides by object 330 and sheet of material 340. Engaging the first coupler 334 with the second coupler 332 both securely couples the object 330 to outer plate 320 and prevents outer plate 320 from being released from inner plate 310 by immobilizing locking elements 322,323.

Locking element 322 further includes a locking projection 324 and locking element 323 further includes locking projection 325. Each locking projection 323, 325 includes a tab that extends from a locking side of each respective locking element. In a locked position, each locking projection 324, 325 extends toward inner plate 310 and away from a direction in which object 330 is disposed above locking elements 322,323 when coupled.

Along with locking elements 322,323, outer plate 320 also includes flanges. A first flange includes a contact surface 326 and a guide surface 328. A second flange includes a contact surface 327 and a guide surface 329. The flanges each project from a same side 321 of a base of outer plate 320. The contact surface 326,327 of each flange extends away from the outer plate 320 at an angle different from an inner side of the respective flange, each inner side opposite a respective contact surface 326,327 and proximate cavity 336. The different angles provide each flange with a wedge shape that narrows in a direction away from a surface 321 of the base of outer plate 320. The guide surface 328,329 on each flange is planar and provides a flat end to each wedge shape. Each guide surface 328,329 is provided at an end of each flange distal from a base of the outer plate 320. The flanges define a cavity 336 adjacent a side 321 of the outer plate 320. In embodiments, such a cavity need not be provided by an outer plate. However, by having such a cavity 336, outer plate 320 and the corresponding mount is configured to be positioned over a portion of a sheet of material that has a non-planar surface feature, such as a button, seam, or wrinkle. In other embodiments, a first coupler of an outer plate may further extend to such a cavity, such that a chamber or other portion of the first coupler is open to this cavity.

Inner plate 310 includes retention structures 312, 314. Two retention structures 312, 314 are illustrated in FIG. 3, though other numbers of retention structures may be provided in other embodiments, including one retention structure or more than two retention structures. Retention structure 312 includes a retention surface 316. Retention structure 314 includes a retention surface 318. As shown, retention surfaces 316,318 are provided at an acute angle toward an adjacent support surface 338,339 on a base of the inner plate 310. The acute angles, along with the support surfaces 338,339 and retention surfaces 316,318 define a channel with a cross-section that has a dovetail shape. Surfaces 326,327,378,329 of the outer plate 320 have a corresponding dovetail shape and are positioned within the channel as shown in FIG. 3. While support surfaces 338,339 are shown as separate surfaces separated by an opening, in embodiments, such surfaces 338,339 may be part of a common support surface.

A channel surface 317,319 is also provided on each retention structure 312,314. Each channel surface 317,319 is disposed on an opposite side of each retention structure 312,314 from retention surfaces 316,318. Each channel surface 317,319 is planar, extending perpendicularly from a base of the inner plate 310. Channel surface 317 is provided on retention structure 312 and forms at least part of a channel on inner plate 310 for receiving retention projection 324. A channel surface 319 is provided on retention structure 314 and forms at least part of a channel on inner plate 310 in which retention projection 325 is received. In other embodiments, channel surfaces may have other angles relative to a base of inner plate, as well as different shapes and/or dimensions relative to each other and/or base of inner plate.

A mount comprising an inner plate and outer plate may be removably retained on a sheet of material via engaging the sheet of material between one or more pairs of surfaces of the mount. Each pair of surfaces may include a first surface of the inner plate and a second surface of the outer plate. Each surface in a pair may engage the sheet of material, as well as the other surface in the pair via the sheet of material.

In embodiments, retaining a mount on a sheet of material may include engaging two or more pairs of surfaces, three or more pairs of surfaces, four or more pairs of surfaces, five or more pairs of surfaces, six or more pairs of surfaces, seven or more pairs of surfaces eight or more pairs of surfaces, nine or more pairs of surfaces, or ten or more pairs of surfaces between components of the mount.

As shown in FIG. 3, mounting system 300 is retained on sheet of material 340 based on engaging the sheet of material 340 between multiple pairs of surfaces of inner plate 310 and outer plate 320.

Multiple pairs of engaged surfaces may be provided on a flange and a retention structure or base of an inner plate. For example, sheet of material 340 is engaged between a contact surface 326 and retention surface 316. Sheet of material 340 is also engaged between a contact surface 327 and retention surface 318. Sheet of material 340 is be engaged between guide surface 328 and support surface 338 of the base of inner plate 310. Sheet of material 340 is engaged between guide surface 329 and support surface 339 of the base of inner plate 310.

Multiple pairs of engaged surfaces may be provided on a locking element and a retention structure or base of an inner plate. For example, sheet of material 340 is engaged between a surface of the locking element 322 and a top surface of retention structure 312, distal to a base of inner plate 310. Sheet of material 340 is also engaged between a surface of the locking element 323 and a top surface of retention structure 314, distal to a base of inner plate 310. Sheet of material 340 is engaged between a side surface of the locking projection 324 and a channel surface 317 of retention structure 312. Sheet of material 340 is also engaged between a side surface of the locking projection 325 and a channel surface 319 of retention structure 314. Sheet of material 340 is engaged between a distal surface of locking projection 324 and a base of inner plate 310. Sheet of material 340 is engaged between a distal surface of locking projection 325 and a base of inner plate 310. Overall, sheet of material 340 is engaged between ten different pairs of surfaces in the cross-section shown in FIG. 3.

Pairs of surfaces engaging a sheet of material may be adjacent to each other. The pairs of adjacent surfaces may be oriented at an angle relative to each other. A sheet of material may be flexible and able to conform to such an angle without tearing or otherwise incurring a decrease in structural integrity. For example, surfaces 316 and 326 are provided at an acute angle relative to adjacent surfaces 328 and 338. A top surface of retention structure 312 and a corresponding surface of locking element 322 are disposed at an angle adjacent channel surface 317 and a corresponding side surface of locking projection 324. Channel surface 317 and a corresponding side surface on projection tab 324 are also provided at an adjacent an end surface on locking projection 324 and a second channel surface parallel to base of the inner plate 310. Sheet of material 340 may be bent, positioned, or otherwise conform through two or more pairs of adjacent surfaces. Sheet of material 340 may be bent, positioned, or otherwise conform through three or more pairs of adjacent surfaces, four or more pairs of adjacent surfaces, or five or more pairs of adjacent surfaces.

A sheet of material may be disposed between three or more pairs of surfaces of an inner plate and outer plate in two different adjacent angles. The angles may be acute, obtuse, right angles, or combinations thereof. A sheet of material may be disposed planar between a pair of the adjacent angles. For example, a sheet of material may be disposed in a first acute angle and a subsequent obtuse angle by an inner plate and an outer plate. In FIG. 3, sheet of material 340 is disposed at an acute angle along contact surface 326 and guide surface 328 and then an obtuse angle along contact surface 326 and a surface of locking element 322, wherein the angles are determined relative to a same surface of the sheet of material 340. Adjacent, multiple angles may dispose the sheet of material in a Z-fold. An adjacent angle may also be a right angle, as shown by the angle formed between a top surface of the base of inner plate 310 and surface 317 of the retention structure 312 along which sheet of material 340 is disposed, the right angle being determined relative to a same, inner plate-facing surface of sheet of material 340. A matching set of adjacent surfaces is provided among a base, retention structure, flange, and locking element on the opposite end of the mount shown in FIG. 3, where a second pair of adjacent surfaces is provided for each pair of adjacent surfaces on a first end of the inner plate 310 and outer plate 320. A set of angles is also provided on the opposite end of the mount shown in FIG. 3, where each angle on a first end of the mount has a mirrored, symmetrical, and corresponding angle provided between an inner plate and outer plate on the second end of the mount. The inclusion of such angles, as well as adjacent angles and multiple adjacent angles may reduce strain placed on an individual part or section of the sheet of material, as well as improve resistance of the mount from being slid or repositioned along the sheet of material from an original location at which the mount is retained on the sheet of material.

A mount may also be releasably retained on a sheet of material by engaging the sheet of material on opposite sides of portions of an inner plate and/or outer plate of the mount. Opposite sides may include surfaces that face away from each other. Opposite sides may be on a same portion, such as a retention structure. For example, sheet of material 340 is engaged on a first side 317 of retention structure 312 as well as retention surface 316, which is disposed on an opposite side of retention structure 312 as illustrated in the cross-section of FIG. 3. Sheet of material 340 is also engaged by contact surfaces 326,327 which are oriented away from each other, as are channel surfaces 317,319, which also engage sheet of material 340. One or more such relative arrangements may also improve resistance of a mount from being slid, jarred, or otherwise moved from an original location at which the mount is placed on a sheet of material.

In embodiments according to various aspects of the present invention, a first plate may receive a second plate in one or more orientations. Each orientation may involve the same first plate. Each orientation may involve one or more same structures and same surfaces of the same first plate. The first plate, in combination with properties of the second plate, may enable a mount with the first plate and second plate to be retained on different sheets of material with different material thicknesses in each orientation. A mount comprising the first plate and second plate may be adjustable between different orientations, as well as within a given orientation, such as by receiving the second plate to different distances along the first plate.

Figure 4:
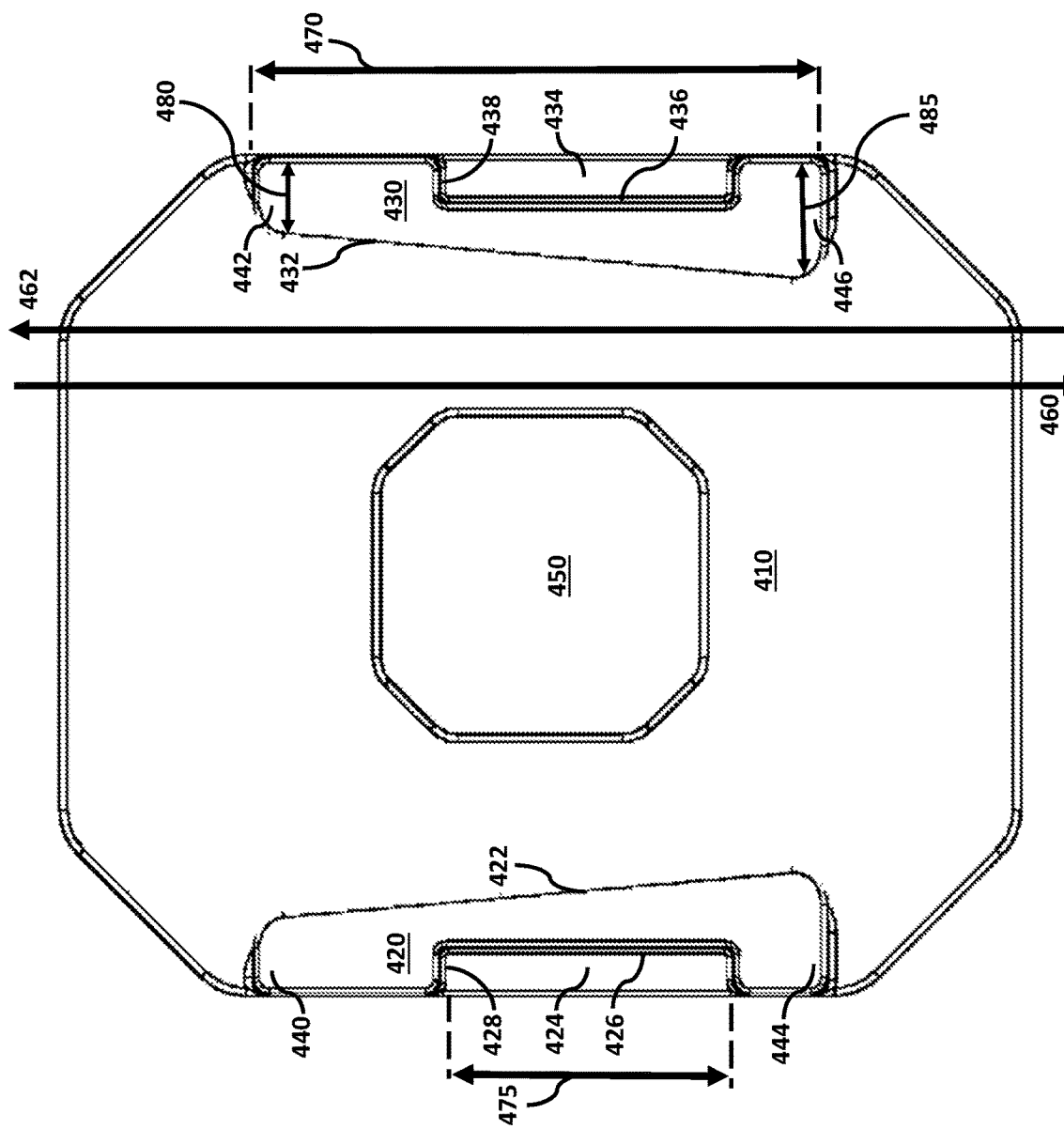
FIG. 4 is an illustration of an inner plate according to various aspects of the present disclosure.

In FIG. 4, a first plate includes inner plate 410. Inner plate 410 has a base with an octagon shape, though other shapes may be employed in other embodiments. The base of inner plate 410 also has an opening 450. The opening 450 has an octagon shape, though other shapes may be employed in other embodiments. The opening 450 reduces the weight of inner plate 410 while retaining structural integrity of the base of the inner plate 410. The opening 450 also provides additional space for an irregular surface feature of a sheet of material, such as a button, to be pressed or otherwise received when the inner plate 410 is retained on a sheet of material with such a feature.

Inner plate 410 includes a first retention structure 420 and a second retention structure 430. First retention structure 420 includes a first side 422 on which a retention surface is provided. Second retention structure 430 includes a side 432 on which a retention surface is provided. The retention surfaces themselves are not shown in FIG. 4 based on an angle between a support surface of the base of the inner plate and each of the retention surfaces.

First retention structure 420 also includes a locking channel 424 and second retention structure 430 includes a locking channel 434. Locking channel 424 includes a channel surface 426 and a locking surface 428. Locking channel 434 includes a channel surface 436 and a locking surface 438. Retention structure 420 also includes a first end 440 and a second end 444, while retention structure 430 includes a first end 442 and a second end 446.

Each retention structure 420,430 may be used with different orientations of a mount including inner plate 410. Retention structure 420 may engage a first flange of a second plate in a first orientation and a second flange of the second plate in a second orientation. Retention structure 430 may engage the first flange of the second plate in the second orientation and the second flange of the second plate in the first second orientation.

First retention structure 420 mirrors second retention structure 430. First retention structure 420 is disposed symmetrically on inner plate 410 relative to second retention structure 430. For example, side 422 on which a retention surface is provided on retention structure 420 is a side closest to a side 432 on which a retention surface is provided on second retention structure 430. Locking channels 424, 434 are also positioned at symmetrical locations about a midline along a length of the base of the inner plate 410.

Retention structure 420 and retention structure 430 are tapered. A width of a tapered retention structure may increase or decrease along a length of the retention structure, where a direction of a length is perpendicular to a direction of a width. For example, a width 480 of second retention structure 430 at a first end 442 is less than a width 485 of the second retention structure 430 at a second end 446 of the retention structure 430. A width of the second retention structure 430 increases along a length 470 of the retention structure 430 between a first end 442 and second end 446 of the retention structure 430. A width of the second retention structure 430 increases in a linear manner along length 470 of the retention structure 430. Based on the shape and orientation of retention structure 430 and inner plate 410, a distance between an edge of the inner plate 410 and a side 432 at a first end 442 of retention structure 430 is less than a distance between an edge of inner plate 410 and the same side 432 at a second end 446 of the retention structure 430. The difference in distances corresponds to an amount to which side 423 is angled along a support surface of inner plate 410 in a direction parallel to length 470.

A width of first retention structure 420 at a first end 440 is also less than a width of the first retention structure 420 at a second end 444 of the retention structure 420. The width of the first retention structure 420 increases along a length of the retention structure 420 between a first end 440 and second end 444 of the retention structure 420. The width of the first retention structure 420 increases in a linear manner along a length of the retention structure 420. Based on a shape and orientation of retention structure 420 and inner plate 410, a distance between an edge of the inner plate 410 and a side 422 at a first end 440 of retention structure 420 is less than a distance between an edge of inner plate 410 and the same side 422 at a second end 444 of the retention structure 420. The distance between a side of a retention structure and an edge of an inner plate may be determined in a direction perpendicular from the edge of the inner plate. Reference distances for each structure may also be determined relative to a midline along a length (not shown) of the inner plate 410 in a direction parallel to direction 460.

Retention structure 420 and second retention structure 430 form a channel along a support surface of the inner plate 410. A channel formed by first retention structure 420 and second retention structure 430 has a dovetail shape. A width of the channel between first ends 440,442 of the retention structures 420,430 is greater than a width of the channel between second ends 444,446 of the retention structures 420,430. The width decreases linearly from first ends 440, 442 of the retention structures 420,430 to second ends 444,446 of the retention structures 420,430. The width is perpendicular to direction 460 and decreases along a length of the channel and inner plate 410. A distance between first ends 440,442 of the retention structures 420,430 is greater than a distance between second ends 444,446 of the retention structures 420,430. The distance may decrease linearly from first ends 440,442 of the retention structures 420,430 to second ends 444,446 of the retention structures 420,430.

A second plate may be received in a single direction 460 in the channel between retention structures 420,430 on inner plate 410. The second plate may be attached to first plate 410 in direction 460. Direction 460 may be one or more of parallel to a support surface of a base of inner plate 410; parallel to a length 470 of a retention structure 420 or 430; parallel to a length of the inner plate 410; parallel to an edge of inner plate 410; perpendicular to an edge of inner plate 410; and/or perpendicular to a width of a retention structure 420 or 430, such as width 480. Direction 460 is the only direction in which the second plate may engage retention surfaces on sides 422,432 of retention structures 420,430. Direction 460 is the direction in which the second plate may engage a support surface of a base of inner plate 410, adjacent retention surfaces of the retention structures 420, 430. The second plate may be retained in the channel between retention structures 420,430 after being received along direction 460.

As a second plate is received in direction 460 in the channel between retention structures 420,430, a width of the channel decreases. The decreasing width defines a decreasing material thickness that may be received in the channel between the second plate and surfaces of the channel. Different portions of a second plate may have different shapes, including different widths, and therefore may travel in direction 460 in the channel in different manners or degrees. As such, the different portions may engage different thickness of material based on the decreasing width of the dovetail-shaped channel and the degree or manner to which each different portion may travel in direction 460 in the channel. A mount comprising inner plate 410 and a second plate is adjustable to receive different material thicknesses based on one or more different manners or degrees to which another portion of the second plate is received in the channel along direction 460.

A second plate may be released from inner plate 410 based on movement of the second plate in direction 462. The direction 462 is parallel to a direction 460 in which the second plate was retained in the channel upon engagement with retention structures 420,430. A direction 462 for release may also be parallel to a surface of a base of inner plate 410 in which the other component may be retained.

After being attached, a second plate may be locked to a first plate via locking portions of the first plate. The locking portions of inner plate 410 include two locking channels 424, 434. Retention structure 420 includes locking channel 424 and retention structure 430 includes locking channel 434. Locking channels 424, 434 are inset into sides of retention structures 420,430 opposite respective sides 422, 432 of the retention structures 420,432. Locking channels 424, 434 are inset on sides of retention structures 420,430 opposite from which another channel is formed between retention structures 420,430, the other channel having a dovetail shape as shown in FIG. 3. Locking channels 424, 434 have a three-dimensional, rectangular shape, inset along an edge of each retention structures 420,430 from two sides of the retention structures 420,430. Locking channels 424, 434 are inset along an edge of each retention structures 420,430 between first ends 440,442 and second ends 444, 446 of the retention structures 420,430, respectively.

Locking channels 424, 434 each include a locking surface configured to engage corresponding surfaces of a second plate, wherein the second plate is locked to the inner plate based on the engaged surfaces. Locking channel 424 includes locking surface 428 and locking channel 434 include locking surface 438. Locking channels 424,434 also include channel surfaces 426,436 adjacent and locking surfaces 428, 438. Each surface 426, 428, 436, 438 may engage a sheet of material disposed between the surface and a respective portion of a second plate. Each surface 426, 428, 436, 438 may compress, hold, and/or prevent movement of a sheet of material disposed between the surface and the respective portion of the second plate.

Locking surfaces 428,438 are disposed at ends of locking channels 424,434 closest to a direction 460 in which a second plate may be first received by or first engage inner plate 410. Locking surface 428 is positioned at a first end of channel 424 along direction 460. Locking surface 428 is positioned at an end of channel 424 closest to a first end 440 of retention structure 420. Locking surface 438 is positioned at a first end of channel 434 along direction 460. Locking surface 438 is positioned at an end of channel 434 closest to a first end 442 of retention structure 430. Within each locking channel 424,434, each locking surface 428,438 is disposed in direction 462 and is disposed perpendicular to directions 460,462. Locking surface 428 and locking surface 438 prevent movement of portions of a second plate in direction 462 when the portions are inserted in locking channels 424,434. Movement in direction 462 is prevented beyond surfaces 428,438 from within the respective channels 424,434. The portions of the second plate may be received into locking channels 424,434 in a direction different from directions 460,462 associated with attaching and releasing a second plate to inner plate 410.

Each locking surface 428,438 may be used with different orientations of a mount including inner plate 410. For example, locking surface 428 may engage a first end surface of a first locking projection in a first orientation and a second end surface of a second locking projection in a second orientation. Locking surface 438 may engage a first end surface of the second locking projection in the first orientation and a second end surface of the first locking projection in the second orientation.

Each channel surface 426,436 may be used with different orientations of a mount including inner plate 410. For example, channel surface 426 may engage a side surface of a first locking projection in a first orientation and a side surface of a second locking projection in a second orientation. Channel surface 436 may engage the side surface of the first locking projection in the second orientation and the side surface of the second locking projection in the first orientation. The same side surfaces of the locking elements may be engaged by the same channel surfaces 436,438 in each orientation, though the specific pairing of each channel surface and side surface differs between the two orientations.

A length of a locking channel may be greater than a length of a portion of another component to be inserted or received in the channel. For example, a length 475 of locking channel 424 may be greater than a length of a locking projection, tab, or other portion of a second plate configured to be inserted therein. Such an arrangement enables a portion of the second plate to be initially disposed at a range of locations in the locking channels 424,434, though prevented from being moved, travelling, or otherwise transferring beyond the locking surfaces 428,438 of the locking channels 424,434. A mount comprising such a locking channel may be adjustable in accordance with the range of locations in the locking channel at which the portion of the second plate may be initially received in the locking channel.

In embodiments according to various aspects of the present disclosure, a mount includes an outer plate. The outer plate may include different portions including a base, portions for retaining the second plate on a first plate, and portions for coupling the outer plate to an object. In embodiments, the object is a camera and the mount is a camera mount.

Retaining an outer plate to a first plate may involve attaching the outer plate to the first plate and locking the outer plate to the first plate. A sheet of material may be provided between the first plate and outer plate, thus attaching the sheet of material to the first plate, attaching the sheet of material to the outer plate, locking the sheet of material to the first plate, and locking the sheet of material to the outer plate.

A component that is attached to a second component may be prevented from moving in one or more directions relative to the second component. A component locked to a second component may be prevented from moving in one or more directions relative to the second component in which the component had moved, slid, traveled, or was enabled, configured, or physically permitted to move, slide, or travel prior to the component being locked to the second component.

A component may be locked based on actuation of a locking element. Actuation may include changing a position of the locking element from a first position to a second position, different from the first position. The first position and the second position may involve different physical locations, orientations, and/or shapes of the locking element, including those that vary relative to another portion of an outer plate, such as a base.

To retain an outer plate to a first plate, the outer plate may include multiple portions for retaining that engage the first plate in different manners. For example, a first portion of the outer plate may engage the first plate in a first direction, while a second portion of the outer plate may engage the first plate in a second direction, different from the first direction. The first direction may be linear and the second direction may be a rotational direction. The second direction may be perpendicular to the first direction. The second direction may have an axis of rotation perpendicular to the first direction. The first portion of the outer plate may first engage the first plate at a first time, while a second portion of the outer plate may first engage the first plate at a second, later time, resulting in the engagement of both first and second portions after the second portion has engaged the inner plate. Engagement of one or more first portions for retaining may attach the outer plate to the first plate. Engagement of one or more second portions for retaining may lock the outer plate to the first plate.

FIG. 5 is an illustration of different views of an outer plate according to various aspects of the present disclosure. Outer plate 510 includes a first portion for retaining the outer plate 510 to a first plate, flange 530. Outer plate 510 also includes a second portion for retaining the outer plate 510 to a first plate, flange 531. Flanges 530,531 are interconnected via a base 520. Base 520 includes a support surface 532 on which a coupler is provided. FIG. 5 includes FIG. 5A, FIG. 5B, and FIG. 5C.

Outer plate 510 also includes portions for retaining that lock the outer plate 510 to a first plate. For example, outer plate 510 includes locking element 522 and locking element 523. Each locking element 522,523 is a locking arm. Each locking element 522,523 includes a respective locking projection 524,525. FIG. 5A shows each locking element 522, 523 in a respective, unlocked position, wherein an elongated portion of each locking element 522,523 is not parallel or co-planar with base 520.

Locking projections 524,525 are tabs. Each locking projections 524,525 is configured to be received in a locking channel of a first plate. Locking projections 524, 525 have a mirrored, symmetrical configuration. Locking projections 524,525 are rectangular in shape. Locking projection 524 is provided on a locking side of locking element 522, oriented and configured to be rotated away from locking element 525 from an unlocked position to a locked position. Locking projection 525 is provided on a locking side of locking element 523, oriented and configured to be rotated away from locking element 522 from an unlocked position to a locked position.

Each locking projection 524, 525 includes multiple surfaces configured to engage a locking surface of another component to which outer plate 510 may be locked. For example, as shown in FIG. 5B, locking projection 524 includes an end surface on a first end 566 for engaging a first locking surface on a first plate. Locking projection 524 also includes an end surface on a second end 568 for engaging a locking surface on another component. Ends 566,568 are provided on opposite sides of projection 524. In embodiments, locking projection 525 includes a corresponding set of ends and such first and second end surfaces, mirroring end surfaces on ends 566,568 of locking projection 524. The end surface at each end 566,568 may engage a corresponding locking surface of a first plate at different times. The end surface at each end 566,568 may engage a different locking surface of a first plate. Outer plate 510 is configured to engage an end surface at either end of each locking projection 524,525 depending on a relative orientation between the outer plate 510 and a first plate. For example, outer plate 510 enables a first end 566 to engage a locking surface on the first plate when the outer plate 510 is provided in a first orientation. The outer plate 510 also enables a second end 568 to engage a locking surface on a first plate when the outer plate 510 is provided in a second orientation, different from the first orientation. When outer plate 510 is disposed in a second orientation, the end surface on end 566 may be disengaged and/or separated from a locking surface to which the surface on end 566 is engaged when outer plate 510 is disposed in the first orientation.

Locking surfaces of the first plate that engage the end surfaces on each end 566,568 in the first and second orientations are different. However, in embodiments according to various aspects of the present disclosure, a same locking surface may engage end surfaces on different locking projections 524,525. Particularly, a first orientation of outer plate 510 relative to the first plate may involve a first end surface at end 566 of the first locking projection 524 engaged with a first locking surface of the first plate and a first end surface of the second locking projection 525 engaged with a second locking surface of the first plate. A second orientation of the outer plate 510 relative to the first plate may involve a second end surface at second end 568 of the first locking projection 524 engaged with the second locking surface of the other component and a second end surface of the second locking projection 525 engaged with the first locking surface of the first plate, where the first locking surface is different from the second locking surface. Different surfaces on a locking projection may be configured to engage different portions of a first plate, though such engagements may be provided, applied, or established separately and not concurrently.

In embodiments, a length of each locking projections 524,525 may be less than a length of each locking channel of a first plate in which the locking projections 524,525 are configured to be inserted or received. For example, length 564 between ends 566 and 568 may be less than a length of a channel on an inner plate that receives the locking projection 524 when the locking element 522 is disposed in a locked position. This difference in lengths permits locking projection 522 to be received at different locations along the channel in an orientation, wherein a mount with the locking projection 522 is adjustable in the orientation in accordance with the different locations along the channel.

Outer plate 510 also includes a locking tab 540 on a side of a base 520. Locking tab 540 is positioned at a center of a width of base 520 in a direction parallel to length 560. Locking tab 540 extends from the side of base 520. Locking tab 540 is configured to engage a second locking tab 580 positioned on locking element 522. Particularly, locking tab 540 is configured to engage second locking tab 580 as locking element 522 rotates into a locked position. In a locked position, locking tab 580 is positioned between locking tab 540 and contact surface 570. Locking tab 580 protrudes from locking element 522 to a distance sufficient to engage locking tab 540, causing locking tab 580 to resist being rotated or transferred across locking tab 540 from a locked position for locking element 522. Locking tabs, such as tabs 540, 580, maintain a locking element in a locked position prior to coupling of an outer plate to another object, such as a body camera. A locking tab 541 is also disposed on an opposite side of base 520 to engage another locking tab on locking element 523 in a same manner.

As shown in FIG. 5B, locking element 522 has an arcuate shape. Locking element 523 has a same shape. Locking projection 524 is positioned symmetrically about a midpoint of a length of locking element 522. An overall shape of locking element 522 is also symmetrical with respect to a midpoint of a length of the locking element in a direction parallel to a length 564 of the locking projection 524. An inner surface of locking element 522 has a shape corresponding to a shape of half of a perimeter of a base of the base 520. This corresponding shape permits the locking element 522 to be rotated toward a base 520 and disposed around half of a perimeter of the base 520.

As shown in FIG. 5A, locking elements 522, 523 are pivotally connected to base 520 via pins 550,551. Pin 550 provides a pivot axis about which locking element 522 rotates. Pin 550 provides a pivot axis about which locking element 522 rotates between an unlocked position and a locked position. Pin 551 provides a pivot axis about which locking element 523 rotates. Pin 551 provides a pivot axis about which locking element 523 rotates between an unlocked position and a locked position. Pivot axes established by pins 550 and 551 are parallel to each other. A second pin for each locking element 522,523 is disposed on an opposite side of base 520 from pins 550,551, such that pin 550 and a second pin extend through different portions of locking element 522 on a same pivot axis and pin 551 and another second pin extend through different portions of locking element 523 on a same pivot axis. The pins 550,551 are disposed on a side of base 520 different from and not adjacent to sides of base 520 on which flanges 530,531 are disposed. The pins 550,551 are disposed on sides of base 520 that are perpendicular to sides of base 520 on which flanges 530,531 are disposed. In other embodiments, other relative arrangements between a locking element and a base of an outer plate may be provided, including those in which a locking element is inset or at least partially inset into a base of an outer plate, rather than being positioned adjacent to a base as shown in FIG. 5.

Outer plate 510 includes a first flange 530 and a second flange 531. Each flange 530,531 includes an inner side, closest to a midpoint on a surface 533 of base 520. Each flange 530,531 also includes a guide surface 538,539 at an end of each flange distal to a location at which each flange is respectively integrated on a surface 533 of base 520. Guide surfaces 538,539 are parallel each other, each configured to engage a sheet of material. Guide surfaces 538, 539 are configured to engage the sheet of material in both a first and second orientation of outer plate 510 in a mount. Guide surfaces 538,539 are configured to engage a same support surface of a first plate in both a first and second orientation of outer plate 510 in a mount.

Outer plate 510 also includes four outer sides on flanges 530,531. Flanges 530,531 each include two outer sides opposite a respective inner side of each flange 530,531 closest to a midpoint of surface 533. Flanges 530, 531 are disposed symmetrically about a midline 595 along a length of the base 520. Flanges 530,531 are positioned at a periphery of outer plate 510. A same surface 533 of base 520 is adjacent to both flanges 530,531.

Each outer side includes a contact surface. An outer side of flange 530 includes a first contact surface 570. An outer side of flange 531 includes a second contact surface 573. An outer side of flange 531 also includes a third contact surface 571. An outer side of flange 530 also includes a fourth contact surface 572. Contact surface 570 and contact surface 571 are symmetrically positioned on the base 520. Contact surface 572 and contact surface 573 are symmetrically positioned on the base 520. Each contact surface 570, 571, 572, 573 is oriented at a same angle relative to a plane of surface 533. In embodiments, this angle is a same angle as an angle of a dovetail shape of a channel perpendicular to a support surface of an inner plate.

Different sets of one or more contact surfaces may be associated with a relative orientation between the outer plate and a first plate. For example, contact surface 570 and contact surface 571 may be associated with a first orientation. Contact surface 572 and contact surface 573 may be associated with a second orientation.

In a first orientation, contact surface 570 and contact surface 571 may engage a respective retention surface on another component. In a second orientation, contact surface 572 and contact surface 573 may engage a respective retention surface on another component. A same retention surface of an inner plate may be engaged with one of the contact surfaces in each of two or more orientation. For example, a same retention surface may engage contact surface 570 and contact surface 573, though in different orientations. A same retention surface may also engage contact surface 571 and contact surface 572, though in different orientations.

Contact surfaces 570 and contact surface 573 have different dimensions. Contact surface 570 has a first length 560 and contact surface 573 has a second length 563. A length 560 of contact surface 570 is greater than a length 563 of contact surface 573. A height of each contact surface 570, 573 is the same, allowing each contact surface 570, 573 to engage a same portion of a first plate.

Contact surfaces 571 and contact surface 572 have different dimensions. Contact surface 571 has a first length 561 and contact surface 572 has a second length 562. A length 561 of contact surface 571 is greater than a length 562 of contact surface 572. A height of each contact surface 571, 572 is the same, allowing each contact surface 571, 572 to engage a same portion of a first plate.

In embodiments, a contact surface with a shorter length may be associated with retaining a mount on a sheet of material with a smaller or thin thickness, while a contact surface with a longer length may be associated with retaining a mount on a sheet of material with a larger or thick material thickness. This difference may be associated in accordance with a manner or degree to which each contact surface engages a common portion of an inner plate. In other embodiments though, other relative properties of contact surfaces, aside from a length, may affect a manner or degree in which different contact surfaces engage a first plate, as well as a material thickness associated with each contact surface.

For outer plate 510, a length 560 of a first contact surface 570 and length 561 of a third contact surface 571 are equal. A length 563 of a third contact surface 573 and length 562 of a fourth contact surface 572 may be equal. Such matching lengths may permit contact surfaces 570,571 to engage another component at a same time and to a same manner or degree. Matching lengths 562,563 may also permit contact surfaces 572,573 to engage another component at a same time and to a same manner or degree, though separately from contact surfaces 570,570.

Contact surfaces with same lengths may be positioned on different flanges, but also on a same end of an outer plate. For example, contact surfaces 570 and 571 are provided on a first end of a base. Contact surfaces 572 and 573 are positioned at another end of the outer plate, opposite an end at which contact surfaces 570 and 571 are disposed. Such positioning allows the contact surfaces to be associated with a same orientation of a mount and a same thickness of a sheet of material. Such a placement enables the corresponding pairs of contact surfaces to engage other portions of another component at a same time and/or by moving the outer plate in a same single direction. Outer plate is reversible between an orientation associated with contact surfaces 570,571 and an orientation associated with contact surfaces 572,573.

Contact surfaces may also be positioned on different ends of an outer plate. Pairs of such contact surfaces may be associated with different orientations of a mount. Such a placement may enable the pairs of contact surfaces to engage a same portion of another component at different time. For example, first contact surface 570 is provided at an opposite end of base 520 from which second contact surface 573 is positioned. Third contact surface 571 and fourth contact surface 572 are also positioned and opposite ends of base. Different ends of a base may be defined relative to various lines, including either side of lines such as midline 595 along a length or line 574 along a width of base 520.

Pairs of contact surfaces are also provided in different radial directions relative to a center of base 520 at a midpoint of midline 595. These different radial directions include opposite radial directions separated by one hundred-eighty agrees about the center of base 520, such as for first contact surface 570 and second contact surface 573, as well as third contact surfaces 571 and fourth contact surface 574. These different radial directions include radial directions separated by ninety degrees, such as for contact surfaces 570 and 571, as well as contact surfaces 570 and 574.

Each pair of contact surfaces 570, 572 and contact surfaces 571,573 meet at a non-zero angle. As shown in FIG. 5C, each pair of surfaces meets at an obtuse angle. Contact surfaces 570, 572 meet a junction along line 574 at a first angle. Contact surfaces 571,573 meet at a junction along line 574 at a second angle. The first and second angles are equal in the illustrated embodiment. The junction between contact surfaces 570 and 572 is concave relative to base 520 of outer plate 510, such that the junction of the two surfaces extends further away from a base 520 than an end of each surface 570,572 opposite the junction. The junction between contact surfaces 571 and 573 is also disposed concave relative to base 520, such that the junction of the two surfaces 571,573 protrudes further away from base 520 than an end of each surface 571,573 opposite the junction. At the junction along line 574, ends of each contact surface 570-573 are located at a common width across base 520, such that a width between ends of contact surfaces 570 and 571 and a width between ends of contact surfaces 572 and 573 are equal along line 574.

Corners of each flange may be provided at a distance from a midline of a width of a base of an outer plate, the midline oriented parallel to a length of the base. These corners may be provided at an elongated end of each contact surface opposite an end at which each contact surface adjoins another contact surface. For example, an end of each contact surface 570, 571, 572, 573 is positioned at a respective distance 590, 591, 592, 593 from a midline 595 of base 520 of outer plate 510. In the embodiment of FIG. 5C, distance 590 is equal to distance 591 and distance 592 is equal to distance 591. Distance 590 is less than distance 592 and distance 591 is less than distance 593. Because a combination of distances 590 and 591 are shorter than a combination of distances 593 and 592, the two combinations may each engage a common channel on an inner plate in one or more different manners or degrees.

In some embodiments, different distances or widths between two contact surfaces in an orientation may be associated with a material thicknesses, including for different material thicknesses for orientations with different such distances or widths. For example, a higher width may be associated with a lower or thin material thickness, while a lower width may be associated with a higher or thick material thickness. As noted elsewhere herein, other properties of a contact surface may alternately or additionally affect a manner or amount to which a contact surface engages a first plate, as well as a material thickness associated with the contact surface.

Because contact surfaces meet at a non-zero angle on a flange and a junction of each pair of surfaces is disposed further away from a base than ends of each contact surface 570, 571, 572, 573 distal to the junctions, pairs of the contact surfaces 570,571 and 572,573 are oriented an angle relative to each other. An angle formed between two contact surfaces may be equal to an angle formed by two other contact surfaces. For example, an angle formed by contact surfaces 572 and 573 is equal to an angle formed by contact surfaces 570 and 571. Each angle meets at a point external to the outer plate 510, formed from rays tangential to each pair of contact surface. The rays do not intersect a base 520 of the outer plate 510. By having a same angle, the pairs of the surfaces may each separately engage a common channel formed on another component. Because the two pairs of surfaces are provided at a same angle, have a same height, and overlap in lengths, a shape formed by contact surfaces 572 and 573 is a subset of a shape formed by a combination of surfaces 570 and 571. In embodiments, this angle is a same angle as an angle of a dovetail shape of a channel along a surface of an inner plate.

Combinations of lengths, such as lengths 560 and 562 and lengths 561 and 563, are equal to a length of a base 520 of an outer plate 510. However, length 560 is greater than length 562 and length 561 is greater than length 563. Length 561 is equal to length 560 while length 563 is equal to length 562. Because of the differences between adjacent lengths, the outer sides and respective flanges 530, 531 are positioned asymmetrically about a midpoint of a width of the plate 520, wherein the width of plate 520 is perpendicular to lengths 560, 563 and lengths 561,562.

As shown in FIG. 5B, a junction between contact surfaces 570 and 572 is provided at a location indicated at line 574. Line 574 is offset from a midpoint of a width or a midline along the width of base 520. For example, as shown in FIG. 5B, line 574 is closer to an end 568 of locking projection 524 than a middle of locking projection 524. Line 574 is farther away from end 566 of locking projection 524 than a middle of the locking projection 524. Line 574 does not bisect a length 564 of locking projection 524. Locking projection 524 is positioned symmetrically with respect to a midpoint of a combination of distances 560 and 562, such that a midpoint of this combination of distances is aligned with a midpoint of length 564 along a length of outer plate 510. An end of contact surface 570 is closer to a corresponding end surface at end 568 than a relative distance between an end of contact surface 572 and a corresponding end surface at end 566. Contact surface 570 is closer to end 568 along a length of outer plate 510, while contact surface 572 is farther away from end 566 along the length of outer plate 510. A same set of relationships exist for contact surfaces 571,573 and locking projection 525, which are positioned symmetrically about midline 595 with respect to contact surfaces 570,572 and locking projection 524.

Different distances between pairs of contact surfaces and corresponding end surfaces on locking elements may affect a manner or degree in which different contact surfaces are configured to engage a common portion of a first plate. Different manners or degrees of engagement may associate different contact surfaces with different material thicknesses or configure different contact surfaces to be associated with different material thicknesses. In embodiments, a higher or larger distance between an end surface of an outer plate and an end of a contact surface in an orientation may be associated with a lower or thin material thickness, while a shorter or smaller distance between an end surface of an outer plate and an end of a contact surface in an orientation may be associated with a higher or thick material thickness. For example, different distances between end 566 and contact surface 572 compared to end 568 and contact surface 570 enable a common width of the outer plate 510 at the junction at line 574 to be locked at different depths or distances within a channel on an inner plate. The distance between end 566 and contact surface 572 enables, configures, or requires an end of contact surface 572 at this common width to be locked further, deeper, or at a greater distance along the channel than is enabled, configured, or required by a distance between end 568 and contact surface 570. This difference in depth or distance along the channel for the common width enables a different thickness of material to be retained between the common width and the inner plate, wherein an increasing distance or depth along the channel of the inner plate for the common width enables a decreasing thickness of material to be retained, engaged, or positioned between the inner plate and the outer plate at the common width. Accordingly, a relative position of contact surface 570 associates contact surface 570 or configures contact surface 570 to be associated with a different thickness of material than a relative position of contact surface 572. End 566 and contact surface 572 in a first orientation are associated with a thin material thickness, while end 568 and contact surface 570 in a second orientation are associated with a thick material thickness. Other properties of a contact surface may alternately or additionally affect a manner or degree to which a contact surface engages a first plate, as well as a material thickness associated with the contact surface.

Symmetry for locking elements enables a same locking element to lock an outer plate to an inner plate in each of a first orientation and a second orientation. Symmetry for locking projections, including projections 524 and 525, enables the same locking projections to be used with the outer plate 510, regardless of whether the outer plate 510 is provided in a first orientation or a second orientation. Symmetry for locking projections, including projections 524 and 525, enables the same locking projections to be used with the outer plate 510, regardless of whether the outer plate 510 is provided in a first orientation or a second orientation. Symmetry for locking projections 524,525 also enables for a same set of channels, inset regions, or concave regions on a first plate to receive and be configured to lock each locking projection 524,525, regardless of whether the outer plate 510 is provided in a first orientation or a second orientation. However, asymmetry of sets of contact surfaces 570-573 enables each of the first orientation and the second orientation to be associated with a different material thicknesses.

Figure 6B:
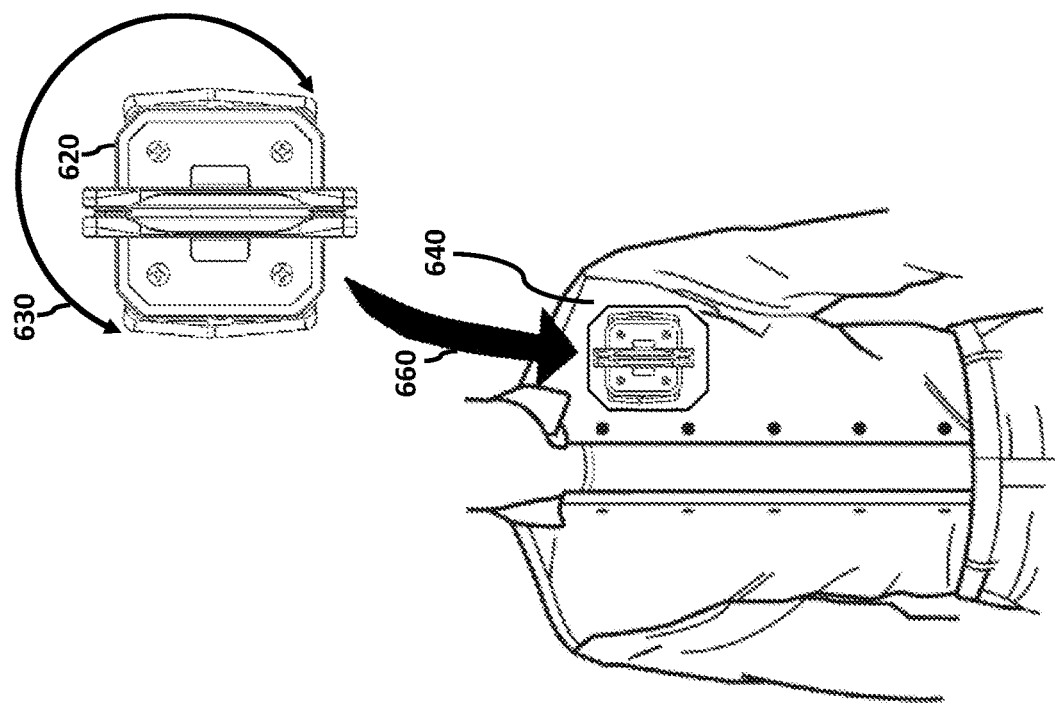
FIGS. 6A-6B are illustrations of an example embodiment of positioning a mount on a sheet of material according to various aspects of the present disclosure.
Figure 6A:
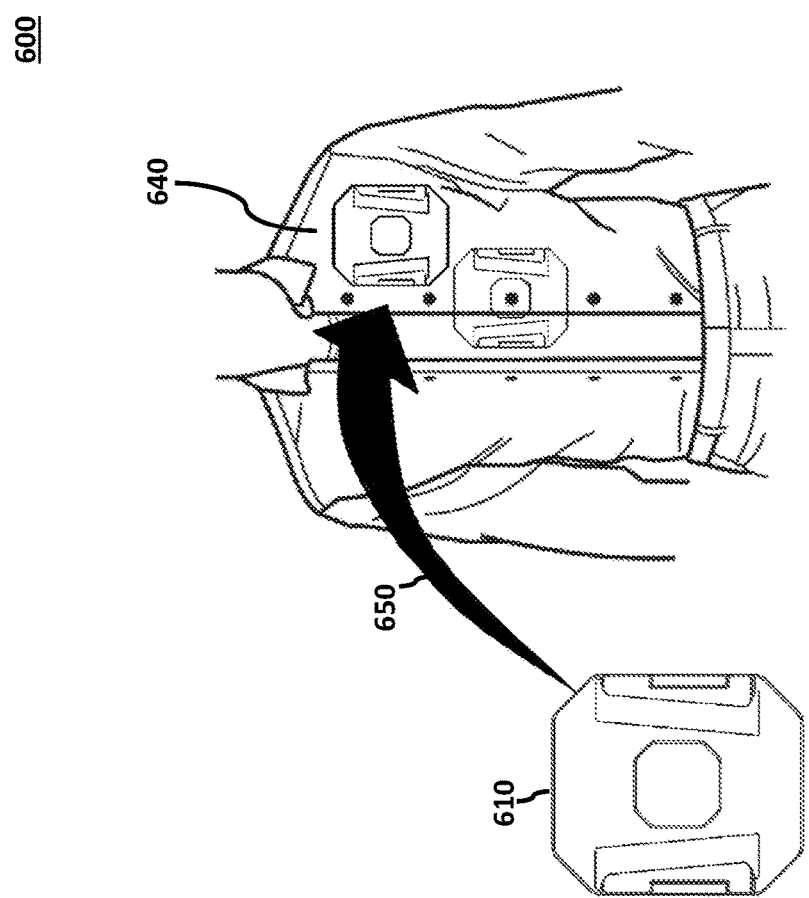

FIG. 6 is an illustration of an example embodiment of positioning a mount on a sheet of material according to various aspects of the present disclosure. Positioning a mount on a sheet of material comprises placing a first plate on a first side of a sheet of material. A first side of a sheet of material may be a side of clothing or other body-worn gear designed, configured, or otherwise intended to be worn facing a user's body. For example, a sheet of material may be a part of a shirt or uniform worn by an officer. A sheet of material may be part of an article of clothing. FIG. 6 includes FIG. 6A and FIG. 6B.

As shown in FIG. 6A, inner plate 610 may be placed inside a shirt. An inner plate may be placed 650 at one side of a shirt, at a location 640 between a center band of a shirt front and a sleeve of the shirt. In other embodiments, an inner plate may be placed over a button, wherein such a positioning is enabled based on one or more of an opening and cavity provided in the mount. Other positions may also include another part of a shirt body, a part of a jacket, a part of a vest, or part of another form of wearable garments or equipment, including straps or panels of protective gear.

Placing the inner plate 610 on the first side of the sheet of material may include placing the inner plate 610 adjacent or against the sheet of material. Particularly, a side of the inner plate comprising one or more retention structures may be placed against or adjacent the first side of the sheet of material. A narrower end of a retention structure may be oriented or positioned upward or at a higher vertical position on the sheet of material than a wider end of the retention structure. The narrower end of the retention structure may correspond to an end of a channel on the inner plate 610. By placing the end of a retention structure in this manner, another component may be slid in a vertical direction along the sheet of material and against a retention surface of the retention structure, thereby engaging the inner plate with a corresponding portion of the other component. The vertical direction may be in a same direction as gravity, which may assist with keeping the other component engaged with the outer plate after the other component is slid along the inner plate.

In a first orientation, a first set of one or more contact surfaces of an outer plate may be aligned to face one or more corresponding retention structures on an inner plate. Indicia may be provided on a surface of the outer plate indicating the first orientation and the material thickness associated with the first orientation.

In a second orientation, a second set of one or more contact surfaces of an outer plate may be aligned to face one or more corresponding retention structures on an inner plate. The one or more retention structures of the inner plate may be the same for each orientation. The second set of one or more contact surfaces may include at least one contact surface not included in the first set of contact surfaces associated with the first orientation. Indicia may be provided on a surface of the outer plate indicating the second orientation and the material thickness associated with the second orientation.

Positioning a mount on a sheet of material includes aligning the outer plate relative to the inner plate based on the determined thickness. Aligning an outer plate to an inner plate may include orienting the outer plate to the inner plate based on a material thickness. The outer plate may be aligned in one of the first orientation, associated with at least a first contact surface and a first material thickness and a second orientation, associated with at least a second contact surface and a second material thickness. The first orientation may include the outer plate being rotated such that a first contact surface is oriented toward or facing a retention structure. The second orientation may include the outer plate being rotated such that a second contact surface is oriented toward or facing a retention structure. The outer plate may be rotated about a single axis between the first orientation and the second orientation.

An outer plate may be rotated between each different relative orientation between components of a mount. For example, a mount may be rotated one-hundred eighty degrees about an axis between a first orientation and a second orientation. In this example, the outer plate is reversible between the first orientation and the second orientation. A mount may be rotated by different degrees for two or more orientations. In embodiments, a mount may also be rotated about more than one axis for different orientations.

Aligning an outer plate to an inner plate may also involve placing the outer mount in a same plane as an inner plane. For example, an inner plate may include a channel with a dovetail shape. The dovetail shape may be established in a direction perpendicular to a surface of a base of the inner plate, such that a wider end of the channel is adjacent the base of the inner plate and a narrower end of the channel is distal to the base of the inner plate. In such an arrangement, a shape of an inner plate requires an outer plate to be at least partially co-planar with the inner plate in order to be received by the inner plate in the channel. Particularly, this arrangement requires at least a contact surface of an outer plate be at least partially co-planar with an inner plate in order for the contact surface to be received in the channel in a direction perpendicular to the dovetail shape. A co-planar portion of an outer plate enables the outer plate to be received in the channel, attaching the outer plate to the inner plate, including when a sheet of material is disposed between the inner plate and outer plate.

Aligning an outer plate to an inner plate may also involve placing the outer mount at a particular end of the inner plate or in a particular direction relative to the inner plate. For example, an inner plate may include a channel with a dovetail shape. The dovetail shape may be established in a direction parallel to a surface of a base of the inner plate, such that a wider end of the channel is adjacent a first side of the base of the inner plate and a narrower end of the channel is adjacent an opposite side of the base, distal to the first side of the base. An outer plate may have a complementary shape in which one or more contact surfaces have a combined width that is greater than a width of a narrow end of the channel. In such an arrangement, a shape of an inner plate requires the outer plate to be disposed at the first side of the base to be received in the channel by the inner plate. A shape of the one or more contact surfaces of the outer plate physically prevents the outer plate from entering the channel from another open end of a channel. A dovetail shape of the inner plate, including when considered in context with a complementary shape of an outer plate, may permit an outer plate to be received by the inner plate from a single direction or along a single axis. Receiving the outer plate from other directions, aside from the single direction, may be precluded by a physical shape of the inner plate.

In embodiments according to various aspects of the present invention, an inner plate may include a channel with a dovetail shape along two different axes or along two different dimensions. The two axes may be perpendicular to each other. A first axis may be parallel to a surface of the inner plate that provides at least one surface for the channel and a second axis may be perpendicular to this surface. The two axes may also have different lengths. For example, a first axis or dimension parallel to a surface may be larger or longer than a second axis or dimension perpendicular to the surface, even though a channel may have a dovetail shape along each such axis or dimension. Such a shape may attach an outer plate to an inner plate to an outer plate along each dimension in which a dovetail shape is provided. An outer plate may be attached to an inner plate in accordance with two or more dovetail-shaped portions of the inner and outer plates. Inner and outer plates may be attached with a sheet of material disposed between the plates. As noted above, this dovetail shape establishes a direction in which an outer plate may be received by an inner plate, among other functions.

Positioning a mount on a sheet of material also includes engaging a contact surface with a corresponding portion of an inner plate. For example, either a first contact surface or a second contact surface may engage an inner plate in accordance with an orientation associated with each contact surface, each orientation associated with a material thickness. Either a first contact surface or a second contact surface may engage a retention structure based on an aligned inner plate, the engagement retaining the inner plate and outer plate on the sheet of material. Engaging the portions of the inner plate may include sliding an outer plate along a support surface of an inner plate. The outer plate may slide along a surface of a side of a sheet of material supported on an opposite side by the inner plate. An outer plate may slide along one or more guide surfaces provided on the outer plate. An inner plate may receive an outer plate on one or more support surfaces of a base. A sheet of material may be compressed during the engaging of the contact surface with the corresponding portion of the inner plate.

In FIG. 6B, outer plate 620 engages 660 inner plate and sheet of material 640. Outer plate 620 engages 660 inner plate 610 after being rotated 630 into one of a first orientation associated with a first contact surface and a first material thickness and a second orientation associated with a second contact surface and a second material thickness. Outer plate 620 engages a side of the sheet of material 640 opposite a side on which inner plate has been placed. Outer plate 620 engages 660 the inner plate from a side of the inner plate in which a wider end of a channel provided on the inner plate is positioned. Locking elements of the outer plate 620 are disposed in an unlocked position during the engaging 660 of the inner plate and the outer plate 620. Sheet of material 640 is compressed between the inner plate and outer plate 620 by the engaging of the outer plate 620 to the inner plate. Outer plate 620 is slid to engage 660 the inner plate with either the first contact surface or the second contact surface of the outer plate. Upon engagement, the outer plate is attached to the inner plate. After being attached, outer plate 620 may be locked to inner plate 610.

In embodiments, an order in which an inner plate and outer plate are positioned adjacent a sheet of material may be varied; either plate may be positioned adjacent a sheet of material first and be enabled to subsequently engage the other plate. In FIG. 6B, inner plate 610 is shown when placed behind sheet of material 640 for purposes of illustration; in embodiments according to various aspects of the present disclosure, an inner plate would not be visible behind a sheet of material depending on a transparency of the sheet of material.

In embodiments, releasing a mount from a sheet of material comprises moving elements and portions thereof in a sequence opposite from that in which the mount was retained on the sheet of material. For example, an outer plate may be slid along a surface of a sheet of material in a direction away from a portion of the sheet of material at which an inner plate is positioned. Both an inner plate and outer plate may then be removed from a respective surface of a sheet of material.

In embodiments according to various aspects of the present disclosure, a first portion of the outer plate may attach the inner plate to the outer plate, while a second portion of the outer plate may lock the inner plate to the outer plate. In combination, the first portion and the second portion retain the inner plate to the outer plate. A first portion may include a flange, while a second portion may include a locking element. An attached outer plate may be prevented from moving in one or more directions relative to an inner plate, while a locked inner plate may be prevented from moving in one or more directions that were enabled prior to the outer plate being locked.

Figure 7B:
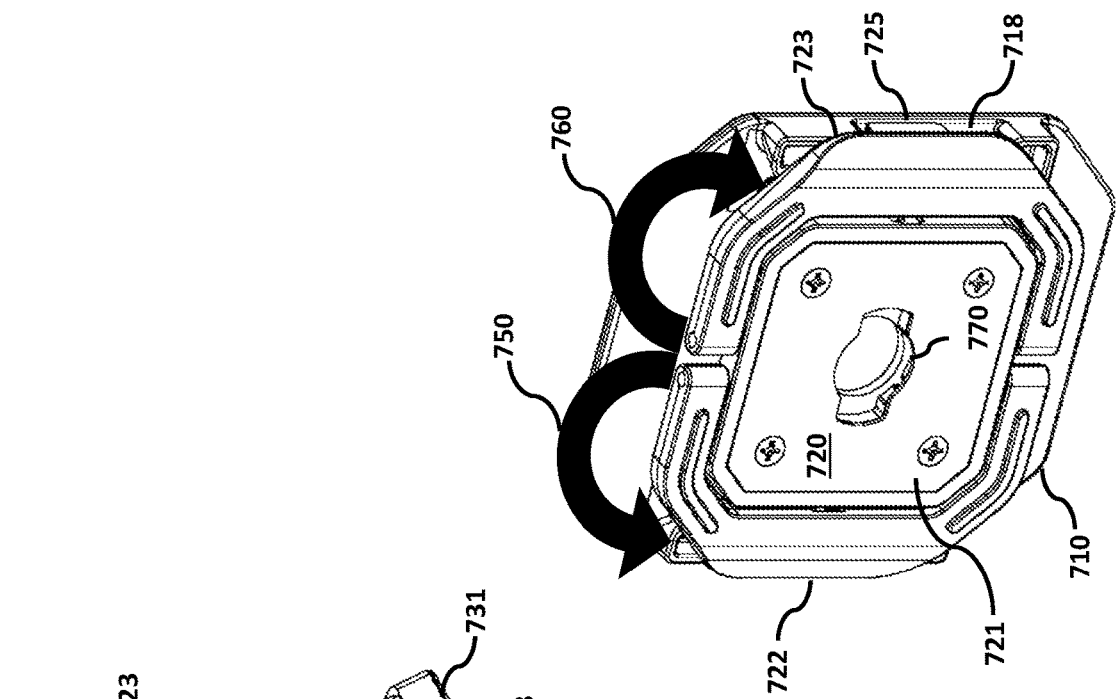
FIGS. 7A-7B are illustrations of an example embodiment of retaining an outer plate on an inner plate of a mount according to various aspects of the present disclosure.
Figure 7A:
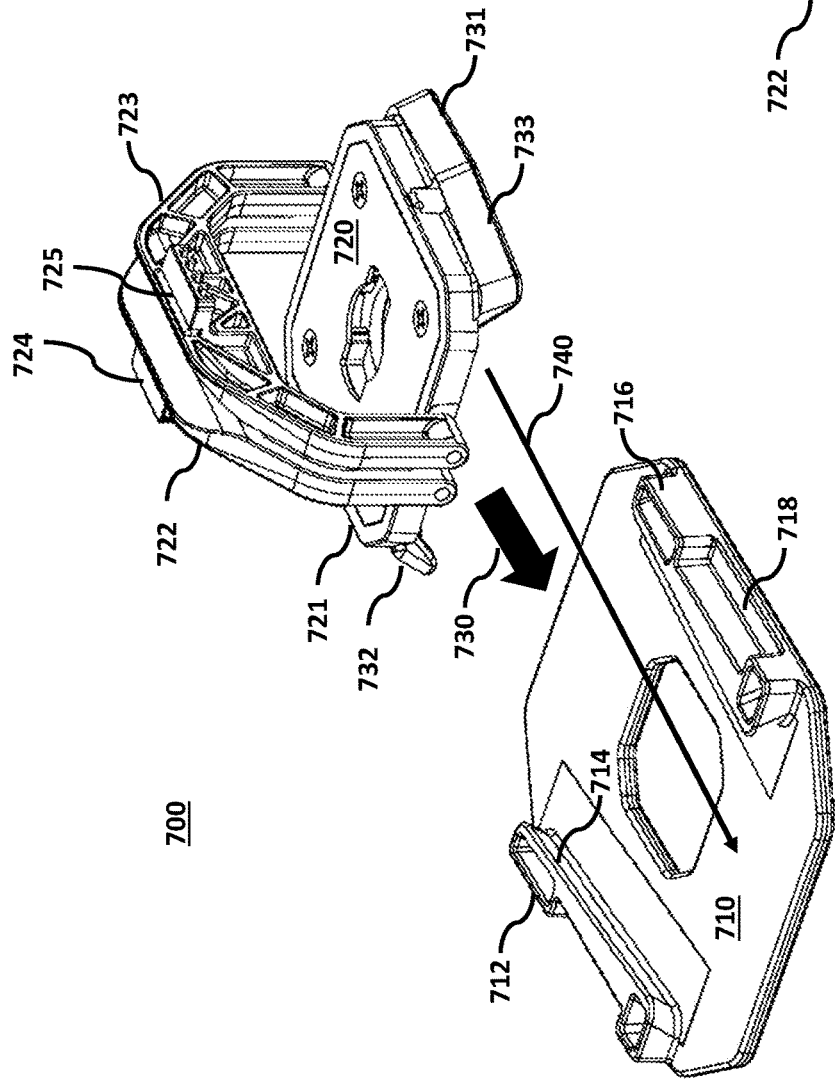

FIG. 7 is an illustration of an example embodiment of retaining an outer plate to an inner plate of a mount according to various aspects of the present disclosure. Retaining a mount to a sheet of material may involve retaining the inner plate to the outer plate with the sheet of material disposed between the inner plate and outer plate. The inner plate and outer plate may be disposed relative to each other in a same manner for each form of retention. Retaining an inner plate to an outer plate may comprise engaging one or more portions of an inner plate with one or more portions of an outer plate. FIG. 7 includes FIG. 7A and FIG. 7B.

Mount 700 includes an inner plate 710 and an outer plate 720. For purposes of clarity, a sheet of material is not shown in FIG. 7. In embodiments according to various aspects of the present invention, a sheet of material is disposed between an inner plate and outer plate and the various portions of the inner and outer plates are configured to engage, move, travel, slide, and be positioned with a sheet of material provided between the inner plate and outer plate.

In FIG. 7A, outer plate 720 attaches to inner plate 710. Attaching outer plate 720 to inner plate 710 includes engaging 730 inner plate 710 along a direction 740. Direction 740 is parallel to a surface of a base of the inner plate 710. Inner plate 710 includes at least one retention structure 712. Retention structure 712 includes a retention surface 714. Retention surface 714 is configured to separately engage either a first contact surface 732 or a second contact surface 731, wherein retention surface 714 is angled at an acute angle toward a surface of the inner plate 710. A second retention structure 716 is also provided on inner plate 710. Each retention structure is disposed on a same side adjacent a same support surface of inner plate 710. The retention structures 712, 716 form a channel on inner plate 710. The channel is bordered by a retention surface of each retention structure 712, 716 and a support surface of a base of the inner plate 710. The channel has a dovetail shape and dovetail-shaped cross-sections along two different dimensions of the inner plate 710. A first dovetail shape is established between retention surfaces along a direction 740. The channel decreases in width along direction 740, which corresponds to a length of inner plate 710. The channel also has a dovetail shape in a direction perpendicular to direction 740. The second dovetail shape narrows in a direction away from a surface of the base forming the channel. The channel decreases in width along a height of the channel extending away from a surface of the base of the inner plate 710.

Outer plate 720 includes portions for both attaching to an inner plate and coupling to an object. Outer plate 720 includes a base 721. Outer plate 720 also includes a flange with a contact surface 732. A second flange on outer plate 720 includes contact surfaces 731 and 733.

Outer plate 720 also includes portions for locking the outer plate 720 to inner plate 710. Outer plate includes a locking element 722. Outer plate includes a second locking element 723. Locking element 722 further includes a locking projection 724. Locking element 723 includes a locking projection 725. Each locking element 722,723 is connected to the base 721 at two respective locations, one on each side of a base 721 for each locking element 722,723. An axis of rotation for each locking element 722, 723 is provided in a direction parallel to a direction 740.

Locking elements 722, 723 are disposed in an unlocked position in FIG. 7A. In an unlocked position, each of locking elements 722, 723 are positioned above a base 721 of the outer plate. An unlocked position includes locking projections 724,725 disposed away from a base 721, including rotated away from base 721. In an unlocked position, locking projections 724,725 and middle portions of locking elements 722,723 are not disposed about a periphery of base 721 and/or co-planar with base 721.

In an unlocked position, a locking element may prevents coupling of an object to a base. A locking element in an unlocked position may physically interfere with access to a coupler disposed on a base. For example, locking element 722 in FIG. 7A prevents a surface of another object from being placed immediately adjacent a support surface of the base 721. Another object, such as a wearable camera, that has a surface larger than a support surface of base 721 is prevented from being placed adjacent the surface of the base 721 by the arrangement of the locking element 722 as shown in FIG. 7A. An unlocked position of a locking element may also prevent other movements of an object, including alternate movements that are adjacent and/or against a support surface of an outer plate.

As shown in FIG. 7A, an orientation associated with contact surfaces 732,733 has been selected for the outer plate 720. Contact surfaces 732, 733 each have an orientation associated with a first thickness of material. An orientation associated with contact surface 731 is not provided, selected, or established in the example embodiment of FIG. 7A. Outer plate 720 is rotated to the orientation associated with contact surfaces 732,733 and not rotated to the orientation associated with contact surface 731. However, the orientation associated with contact surface of 731 may be provided, selected, or established for contact surface 731 by rotating outer plate 720 such that contact surface 731 is proximate retention structure 712, rather than contact surface 732. This rotation may be performed about an axis perpendicular to direction 740. Such a rotation may be applied before outer plate 720 engages 730 inner plate 710. After outer plate 720 has engaged 730 inner plate 710, such a rotation is no longer possible unless or until outer plate 720 is disengaged from inner plate 710 in a direction opposite direction 740.

Engaging 730 the outer plate 720 to inner plate 710 includes engaging various portions of the plates 710, 720. For example, such engagement 730 includes moving outer plate 720 along retention surface 714. Engaging the outer plate 720 with inner plate 710 may include sliding a guide surface of each flange along a side of the inner plate 710 on which retention structures 712,716 are disposed, adjacent a support surface of the inner plate 710. Engaging the outer plate 720 with inner plate 710 includes engaging contact surface 732 with retention structure 712. Engaging the outer plate 720 with inner plate 710 includes engaging contact surface 732 with retention surface 714 on retention structure 712. Engaging the outer plate 720 with inner plate 710 includes engaging contact surface 733 with retention structure 716. Engaging the outer plate 720 with inner plate 710 includes engaging contact surface 733 with a retention surface on retention structure 716.

As outer plate 720 moves along direction 740, a spacing between the inner plate 710 and outer plate 720 decreases. The spacing is decreased across a width of outer plate 720 perpendicular to direction 740. The spacing may also be decreased between guide surfaces of the outer plate 720 and a support surface of the inner plate 710 if not already decreased by engagement 730 of the inner plate 710 and outer plate 720. A decreased spacing reduces an area in which a sheet of material may be provided, thereby increasing compression of the sheet of material as outer plate 720 travels in direction 740. Increased compression may improve retention of the mount on the sheet of material.

As outer plate 720 moves along direction 740, flanges of the outer plate 720 are forced in a direction toward a base of the inner plate 710. The flanges are forced in this direction due to the inward angled orientation of retention surfaces such as surface 714.

As outer plate 720 moves along direction 740, a channel with a dovetail shape formed by retention structures 712 and 716 also causes flanges of the outer plate 720 to be centered within the cavity or forced against retention surfaces of the cavity. A dovetail-shaped cross-section along direction 740 causes flanges to be centered along the cavity, while a dovetail cross-section perpendicular to direction 740 causes the flanges of the inner plate to 710 to concurrently be pressed toward a support surface of a base of the inner plate 710 as the flanges move in direction 740. The flanges are also forced in these directions in accordance with angles of contact surfaces on the flanges, such as contact surface 732, wherein the angles of each contact surface matches the angles of the dovetail-shaped channel between retention structures 712,716. Outer plate 720 moves in direction 740 until contact surfaces 732,733 engage retention structures 712,716 as well as a sheet of material when the sheet of material is positioned between these contact surfaces and retention structures. In embodiments, a distance or depth along inner plate 710 at which outer plate 720 engages inner plate 710 depends in part on a thickness of a sheet of material placed between the inner plate 710 and outer plate 720, wherein the inner plate 710 and outer plate 720 are adjustably engaged within an orientation in accordance with the thickness of the sheet of material disposed between the inner plate 710 and 720.

In embodiments, engaging two components of a mount may involve configuring, establishing, retaining, or leaving one or more surfaces of a first component disengaged from a second component. An orientation between the components may be selected that does not cause, require, or involve engagement between a given surface of a component and another component. For example, as contact surface 733 engages 730 a retention surface on retention structure 716, contact surface 731 does not engage a corresponding surface of a retention structure. A spacing between contact surface 731 and the retention structure 716 is retained throughout engagement between contact surface 733 and retention structure 716. Retention structure 731 is proximate retention structure 716; however, an angle at a junction between retention structure 733 and retention structure 731 ensures that both retention structures 733,731 do not engage a common retention surface via a single movement of the outer plate in direction 740. Further, contact surface 731 is not configured to engage the retention surface of retention structure 716, even in another orientation. Rather, contact surface 731 is configured to engage retention structure 712 in another orientation, different from the relative orientation between inner plate 710 and outer plate 720 shown in FIG. 7A. When contact surfaces 732 and 733 are engaged with retention structures 712, 716, contact surface 731 is disposed within the channel between retention structures 712, 716, but not engaged with either retention structure 712,716. As such, in embodiments according to various aspects of the present disclosure, a contact surface may be configured to engage a first retention structure in a first orientation and to be placed proximate, but not engaged with, a second retention structure in a second orientation, wherein only one orientation may be applied to same components of a mount at a time.

Retention structure 731 may be used in a second orientation of outer plate 720 relative to inner plate 710, different from the orientation shown in FIG. 7. Outer plate 720 is reversible between the first and second orientations. The second orientation may be associated with a different thickness of a sheet of material relative to the first orientation and contact surface 732. To apply the second orientation, outer plate 720 may be rotated one hundred eighty degrees about an axis perpendicular to surface 721, such that contact surface 731 is facing and otherwise aligned with retention structure 712 and retention surface 714. Contact surface 731 may then be engaged 730 with retention structure 712 and retention surface 714 in a direction 740. Contact surfaces 731 and 732 are each configured to separately engage retention structure 712 and retention structure 714 in direction 740. Contact surfaces 731 and 732 are each configured to separately engage retention structure 712 and retention structure 714 within a channel between retention structure 712 and retention structure 716. In the second orientation, contact surface 732 would not engage inner plate 710. By engaging 730 retention structure 712 and contact surface 731, a mount comprising inner plate 710 and outer plate 720 may be retained on different sheets of material with different material thicknesses by engaging either contact surface 732 or contact surface 731.

Each contact surface 731, 732 is associated with different material thicknesses and each contact surface 731,732 is configured to engage retention structure 712. This enables inner plate 710 and 712 to be retained on a first sheet of material with a first material thickness by engaging contact surface 732 with retention structure 712 in a first orientation. Inner plate 710 and outer plate 720 may then be released from the first sheet of material and retained on a second sheet of material by engaging contact surface 731 with retention structure 712 in a second orientation. A mount with inner plate 710 and outer plate 720 may then be released from the second sheet of material and retained on a third sheet of material in either the first orientation or the second orientation in accordance with the thickness of the third sheet of material. Different contact surfaces and different associated orientations enable the same components of a mount to be retained on multiple material thicknesses. The mount is adjustable by placing components of the mount in the different orientations.

Attaching inner plate 710 to outer plate 720 includes engaging 730 at least a contact surface 732 with a retention surface 714. After an inner plate 710 and an outer plate 720 have been attached, retention of the inner plate 710 and 720 to a sheet of material may further include locking the inner plate 710 to the outer plate 720.

Locking an inner plate to an outer plate comprises actuation of a locking element. An inner plate and outer plate may be locked after they have been attached to each other.

As shown in FIG. 7B, inner plate 710 is locked to outer plate 720 after inner plate 710 has been attached to outer plate 720. Locking element 722 rotates in a first angular direction 750. Locking element 723 rotates in an angular direction 760. Angular directions 750 and 760 are opposite to each other. An axis of rotation for each direction 750, 760 may be parallel to each other. Locking elements 722, 723 may be rotated concurrently or sequentially from a respective unlocked position to a locked position for each element 722,723. In FIG. 7B, locking element 722 is disposed in a locked position and locking element 723 is disposed in a locked position.

A direction of motion associated with locking an outer plate to an inner plate may be perpendicular to a direction of motion associated with attaching the inner plate to an inner plate. A direction of motion for locking an outer plate may be provided, performed, or configured to be provided or performed in a plane perpendicular to a direction associated with attaching the outer plate to the inner plate. For example, direction 750 is perpendicular to direction 740. Direction 760 is also perpendicular to direction 740. Locking element 722 and locking element 723 are each configured to rotate in planes perpendicular to a direction 740 in which the locking elements 722, 723 are configured to move with outer plate 720 when outer plate 720 is attached to inner plate 710.

By arranging the attachment and locking motions in different directions, retention of the mount on a sheet of material may be improved, as incidental contact of the mount from a given direction is less likely to both unlock and release an outer plate from an inner plate. For example, an impact from a direction opposite direction 740 will not cause locking elements 722 and 723 to unlock, since they unlock in directions opposite directions 750 and 760. Similarly, an impact, contact, or other force applied opposite directions 750 and 760 will not cause an outer plate to move opposite direction 740, which would be necessary to release inner plate 710 from outer plate 720.

In a locked position, a locking projection or other fastener on a locking element may be provided in a predetermined position relative to a corresponding portion of an inner plate. For example, a locked position for locking element 723 includes locking projection 725 placed within a concave region provided by locking channel 718. In the locked position, a locking projection 725 prevents movement of the outer plate 720 in a direction and distance beyond directions and distances defined by the physical relationship between surfaces of the locking projection 725 and corresponding surfaces of the channel 718. An end surface of a locking projection may not move or is not configured to be move beyond a locking surface of channel when a locking element with the locking projection is provided in a locked position. Such prevention of movement locks outer plate 720 to inner plate 710, precluding a movement of outer plate 720 in a direction opposite 740 that may otherwise be enabled when locking projection 725 is not disposed in locking channel 718. Locking outer plate 720 to inner plate 710 precludes movement of outer plate 720 in a direction opposite 740 that may otherwise be enabled when an end surface of locking projection 725 is not engaged with a locking surface of locking channel 718. This same locking surface of locking channel 718 may also engage an end surface of locking projection 724 when outer plate is rotated to a second orientation relative to inner plate 710.

In a locked position, a locking element may be positioned parallel to a base of an outer plate. A width of the locking element may be disposed parallel to a width of the base. A surface of each of a locking element and a base of an outer plate may be parallel to each other in a locked position. A surface of a locking element may be positioned flush with a support surface of the base. For example, locking element 722 is parallel with a base 721 of outer plate 720 as shown in FIG. 7B. A width of the locking element 722 is disposed parallel to a width of the base 721 of outer plate 720. A width of the base 721 of outer plate 720 may be defined perpendicular to direction 740 along a support surface of base 720 as shown in FIG. 7A.

In embodiments, locking elements may be required to be disposed in an unlocked position for an inner plate to attach to an outer plate. Attaching an outer plate to an inner plate may include positioning a locking element in the unlocked position. The unlocked position may be established prior to attaching the inner plate to the outer plate. The unlocked position may be maintained during attachment of the outer plate to the inner plate. In a locked position, a locking element may prevent or physically preclude attachment of an outer plate to an inner plate. For example, locking elements 722,723 in unlocked positions do not interfere with travel of outer plate 720 along direction 740 to attach to inner plate 710. In a locked position, a surface of a portion of a locking element, such as a surface of locking projection 725, would contact a side of a retention structure such as retention structure 716, preventing movement of the outer plate 720 along direction 740 to engage with the inner plate 710.

In FIG. 7B, each locking element 722,723 is disposed co-planar to the base of outer plate 720 within a plane defined parallel to a surface of base on which coupler 770 is disposed. A surface of each of a locking element 722,723 and base of an outer plate 720 may be parallel to each other in a locked position. At least one surface of each locking element 722,723 and a base of outer plate 720 may be aligned or co-planar. A surface of the locking element 723 disposed parallel is opposite a surface on which locking projection 725 is provided on the locking element 723. In a locked position, locking element 722 is aligned with an outer periphery of a base of outer plate 720 and locking projection 725 is aligned with channel 718 of an inner plate 710. In a locked position, an orientation and position of locking element 722 mirrors an orientation and position of locking element 723 in its locked position. In locked positions, each surface of the locking elements 722,723 is aligned with a surface of the outer plate 720 on which coupler 770 is disposed. Such an arrangement permits an object to access the coupler 770 and one or more surfaces of the outer plate adjacent the coupler 770 without physical contact or interference with a locking element 722 or locking element 723.

When a locking element is locked, access to a coupler in an outer plate may be provided. For example, coupler 770 may be accessed when locking element 722 and locking element 723 are provided in a locked position. A space about the coupler 770, adjacent a surface 721 of the base 720 may be open and unimpeded by physical portions of the outer plate 720. Coupler 770 may be accessed from one or more directions, including those parallel to a support surface of base 721 or perpendicular to this support surface of base 721.

Coupling an object to an outer plate may involve a series of predetermined motions. For example, a second coupler may be inserted into coupler 770. A second coupler (not shown) may be inserted into coupler 770 from a direction perpendicular to a support surface of base 721 which is adjacent coupler 770. Connecting the couplers may involve contacting a surface of the object adjacent to the second coupler to a support surface of the outer plate adjacent the coupler. Contact between surfaces adjacent respective couplers may define a distance to which the second coupler is inserted or received by a coupler of an outer plate.

A second coupler may be rotated after being connected to, inserted into, or received by coupler 770. A second coupler may be rotated a predetermined angle of rotation, thereby securely engaging coupler 770 and the second coupler. A second coupler may be rotated by ninety degrees, for example, in order to securely engage the coupler 770. Rotation of the second coupler may include rotation of an object such as a wearable camera to which the second coupler is integrated. For example, a wearable camera may be rotated to engage a second coupler with coupler 770 of an outer plate 720. An object and second coupler may be rotated in one or more directions parallel to a support surface of the base 721 of the outer plate 720. An axis of rotation for an object and second coupling may be parallel to a direction perpendicular from the support surface of the base 721 in which the second coupler is received or connects to the coupler 770 of outer plate 720. An axis of rotation for an object and second coupler may be parallel to a direction perpendicular from the support surface of base 721 in which the second coupler is received or connects to the coupler 770 of outer plate 720. An axis of rotation for an object and second coupler may be perpendicular to an axis of rotation for directions 750 and 760 of locking elements 722 and 723. The plane in which second coupler rotates in coupler 770 is perpendicular to the plane of rotation for each of locking elements 722,723. A second coupler may be integrated with an object, thereby securely coupling the object to a sheet of material via a mount comprising inner plate 710 and outer plate 720.

After an object and second coupler are received or rotated relative to coupler on an outer plate, the object may prevent movement of one or more locking elements of an outer plate.

A locking element may be configured to selectively engage an inner plate in a first direction and the object may include at least one surface adjacent a second coupler, the at least one surface configured to prevent movement of the locking element opposite the first direction when the second coupler is connected to the first connector. A locking element may be configured rotate about a first axis of rotation to selectively engage an inner plate and a first coupler may releasably connect to the second coupler via rotation of the second coupler about a second axis of rotation, the first axis of rotation perpendicular to the second axis of rotation. For example, a surface of an object adjacent a second coupler on the object may have a dimension that is greater than a corresponding dimension of a base, locking element, and coupler on an outer plate, placing the surface of the object adjacent a surface of the locking element. For example, a length of an object or a surface of the object may be greater than a length of a locking element. A width of an object or a surface of the object may be greater than a corresponding width of a locking element. One or more of a shape, orientation, position of a surface of an object may cause a surface of the object to be placed immediately proximate a locking element. The proximate surface of the object may abut a surface of the locking element. When coupled, an object may prevent motion of a locking element in a direction of an unlocked position for the locking element. The object may prevent motion of the locking element to an unlocked position. The object may prevent motion of a portion of the outer plate that is different or separate from a portion of the outer plate to which the object is directly, physically coupled. The object may prevent rotation or other motion of the locking element in a direction that the locking element may be rotated or moved or is configured to rotate or move when the object is not coupled to the object.

A second coupler and an object may be coupled to coupler 770. According to various aspects of the present disclosure, the object includes a surface that at least extends over a portion of each locking elements 722,723. The object extends parallel and immediately proximate a plane defined by a support surface of base 721. In embodiments, the object may also include a surface that at least extends over an entire surface of locking element 722,723 that is parallel to the support surface of base 721 of the outer plate 720. Upon coupling, a spacing between locking element 722 or 723 and the object may be less than a height of a locking projection 724,725 in a direction away from a locking surface of the respective locking element 722,723 on which each projection 724,725 is disposed. Such a positioning between the object and outer plate 720 prevents locking element 722 from rotation in a direction opposite to direction 750 in an amount otherwise sufficient for locking element 722 to be unlocked. Such a positioning between the object and outer plate 720 also prevents locking element 723 from rotation in a direction opposite to direction 760 in an amount otherwise sufficient for locking element 723 to be unlocked. A same surface of an object may prevent movement of both locking elements 722,723. As such, the object maintains locking elements 722,723 in a locked position, further ensuring retention of the inner plate 710 and outer plate 720 on a sheet of material. Coupling of an object to an outer plate concurrently improves retention of a mount to sheet of material and securely couples the object to the sheet of material via the mount.

Removing an object from a sheet of material may involve performing one or more of the disclosed movements of one or more portions of a mount in a reverse sequence. Removal of an object may include decoupling the object from a mount, as well as releasing the mount from the sheet of material. An inner plate, outer plate, object, or other portion of a mounting system may be moved, rotated, or actuated in a direction opposite to a corresponding direction employed to secure the object to the sheet of material.

FIG. 8 is flowchart that illustrates an example embodiment of a method of securing an object on a sheet of material using a mount according to various aspects of the present disclosure. Method 800 involves a mount comprising an inner plate and an outer plate. The inner plate includes a first retention structure. The outer plate includes a first contact surface and a second contact surface different from the first contact surface.

At block 810, an inner plate of the mount is disposed on a first side of a sheet of material. The inner plate may be disposed adjacent a surface on the first side of the sheet of material. The inner plate may be positioned at a location on the sheet of material at which the sheet of material is planar or flat. Alternately, the inner plate may be positioned at a location on the sheet of material at which the sheet of material includes one or more surface features, such as a location that is around, adjacent, or over a button or seam.

At block 820, an outer plate is aligned based on the determined thickness. The outer plate may be aligned relative to the inner plate. Aligning the outer plate may include orienting the outer plate relative to the inner plate. For example, the outer plate may be aligned in one of a first orientation and a second orientation. A first orientation may be associated with the first contact surface of the outer plate. A first orientation may be associated with the first material thickness. A second orientation may be associated with the second contact surface of the outer plate. A second orientation may be associated with a second material thickness.

Aligning the outer plate at block 820 may include rotating the outer plate. The outer plate may be rotated between the first orientation and the second orientation. Each orientation may be associated with a same retention structure of the inner plate, but a different contact surface of the outer plate. Rotating the outer plate may include rotating the outer plate about a single axis.

Aligning an outer plate may also involve disposing the outer mount in a same plane as an inner plane. For example, an inner plate may include a channel with a dovetail shape. The dovetail shape may limit the outer plate from engaging the inner plate except when the outer plate is at least partially disposed within a same plane as the channel.

Aligning an outer plate to an inner plate may also involve placing the outer mount at a particular end of the inner plate or in a particular direction relative to the inner plate. A length of the channel may also have a dovetail, wedge, or otherwise narrowing shape that prevents the outer plate from being received at a first end of the channel, but enables the outer plate to be received at a second end of the channel. The outer plate may only be received in a direction from the second end, thereby determining a direction relative to the inner plate at which an outer plate may be positioned prior to attaching the outer plate to the inner plate.

Aligning an outer plate of the mount may also include placing the outer plate on a second side of a sheet of material. The second side may be opposite a first side of a sheet of material at which the inner plate was placed. The second side of the sheet of material may be disposed at a location proximate a location on the sheet of material at which the inner plate was placed. The location of the placed outer plate may be associated with a direction by which the outer plate may be attached to the inner plate, wherein the outer plate is limited to attaching to the inner plate from the direction, rather than one or more other directions. After aligning the outer plate at block 840, the method may include retaining the outer plate and inner plate on the sheet of material. Retaining the inner plate on the sheet of material includes attaching the outer plate to the inner plate and locking the outer plate to the inner plate.

At block 830, attaching the outer plate to the inner plate includes sliding the outer plate along the inner plate. Because of the alignment of the outer plate, the outer plate may also be slid along the sheet of material adjacent the inner plate. A direction of the sliding is associated with a shape of one or more portions of the inner plate. The sliding may comprise sliding the first or second contact surface of the outer plate along the retention structure of the inner plate. The sliding may comprise sliding a guide surface of the outer plate along a base of the inner plate.

At block 840, attaching the outer plate to the inner plate includes engaging the outer plate with the inner plate. Particularly, portions of the outer plate engage portions of the inner plate. Portions of the outer plate also engage the sheet of material as part of the attaching of the outer plate to the inner plate. Portions of the inner plate also engage the sheet of material as part of the attaching of the outer plate to the inner plate. The sheet of material may engage the outer plate and inner plate on surfaces of the sheet of material that are directly opposite each other across a thickness of the sheet of material. Attaching the outer plate comprises engaging the outer plate and the inner plate such that movement of the outer plate is prevented in one or more directions relative to inner plate. Movement in at least one other direction, opposite the one or more directions, may be enabled when an outer plate is attached but not locked on an inner plate.

At block 850, locking the outer plate to the inner plate includes actuating one or more locking elements. For example, a locking element may be placed in a locked position. A locking element may be placed in a locked position from an unlocked position. A locking element may be actuated after an outer plate has engaged an inner plate. A locking element may be actuated after an outer plate has slide to a predetermined depth along an inner plate. The predetermined depth may include a location at which an end surface of the locking element passes a locking surface of the inner plate. Locking the outer plate to the outer plate may include engaging an end surface of the outer plate and a locking surface of the inner plate. When locked, an outer plate may be prevented from moving in one or more directions that the outer plate was moved or configured to move prior to locking of the outer plate to the inner plate. After block 850, a mount comprising the inner plate and outer plate is releasably retained on the sheet of material.

At block 860, an object is coupled to the outer plate. The object may be coupled using two or more couplers, one integrated with each of the object and inner plate. The object may be coupled by moving the object in one or more predetermined directions. The one or more predetermined directions may be defined in accordance with a shape of one or more of an outer plate, a coupler on the outer plate, a coupler for the object, and the object. Coupling the object to the outer plate may prevent further actuation of one or more locking elements on the outer plate. For example, a coupled object may prevent rotation of a locking element. Rotation may be prevented in a direction opposite a direction by which a locking element was previously rotated. Rotation may be prevented in a direction opposite a direction by which a locking element was moved from an unlocked position to a locked position. After block 860, an object is securely coupled to a sheet of material via a mount. The method 800 then terminates.

Method 800 involves applying a mount to a single sheet of material with an associated material thickness. In method 800, a single orientation of the mount is applied, engaging a particular set of two or more surfaces and structures between an inner plate and outer plate of the mount. However, the same mount may be retained on a second sheet of material with a different material thickness by repeating method 800 and applying a second orientation between components of the mount. To apply the second orientation, the mount may be released from the single sheet of material and an outer plate of the mount may be realigned with an inner plate of the mount in the second orientation. Realigning the mount may involve rotating the outer plate relative to the inner plate. A different set of two or more surfaces and structures between an inner plate and outer plate of the mount may then be engaged in the second orientation. By enabling method 800 to be repeated with different relative orientations of components of the mount, the same mount may be retained on multiple sheets of material with multiple material thicknesses. The same mount may be used for different material thickness by repeating method 800 with different relative orientations between components of the mount.

Two or more blocks of method 800 may be performed in a certain order, a first block after a second block. For example, attaching the outer plate at block 850 may be required to be performed prior to locking the outer plate at block 860. In embodiments, one or more blocks of method 800 may alternately or additionally be performed in a different order, including by being performed at a same time. An order of blocks in method 800 is illustrated according to various aspects of the present disclosure, but embodiments of the method according to various aspects of the present disclosure are not so limited.

The foregoing description discusses embodiments, which may be changed or modified without departing from the scope of the invention as defined in the claims. For example, certain components or relationships between components may be excluded from some embodiments or optionally included in some embodiments. A component or relative arrangement of components may be provided independent of another component or relative arrangement of any such component. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, specific embodiments of the invention have been described, the scope of the invention is intended to be measured by the claims as set forth below. The location indicators "herein", "hereunder", "above", "below", or other word that refer to a location, whether specific or general, in the specification shall be construed to refer to any location in the specification where the location is before or after the location indicator.

What is claimed is:

1. A mount for multiple material thicknesses, comprising:
an outer plate including:
- a coupler configured to physically connect the outer plate to an object;
- a moveable first locking element;
- a base, wherein the first locking element is moveably connected to the base;
- a first contact surface; and
- a second contact surface; and an inner plate including a first retention structure, wherein the first retention structure is configured to separately engage:
- the first contact surface in a first orientation of the outer plate relative to the inner plate; and
- the second contact surface in a second orientation of the outer plate relative to the inner plate, and wherein, in accordance with a change in position of the first locking element relative to the base, the first locking element:
  - selectively engages the inner plate in the first orientation of the outer plate relative to the inner plate to lock the outer plate to the inner plate in the first orientation of the outer plate relative to the inner plate; and
  - selectively engages the inner plate in the second orientation of the outer plate relative to the inner plate to lock the outer plate to the inner plate in the second orientation of the outer plate relative to the inner plate.

2. The mount of claim 1, wherein the outer plate includes:
a third contact surface; and
a fourth contact surface; and wherein
the inner plate includes a second retention structure configured to separately engage:
- the third contact surface in the first orientation of the outer plate relative to the inner plate; and
- the fourth contact surface in the second orientation of the outer plate relative to the inner plate.

3. The mount of claim 2, wherein the first contact surface is disposed at a first obtuse angle relative to the fourth contact surface and the second contact surface is disposed at a second obtuse angle relative to the third contact surface.

4. The mount of claim 2, wherein the outer plate further includes:
- a first flange, the first flange including the first contact surface and the fourth contact surface; and
- a second flange, the second flange including the second contact surface and the third contact surface.

5. The mount of claim 1, wherein the inner plate includes a second retention structure and a channel, the channel provided along the inner plate between the first retention structure and the second retention structure.

6. The mount of claim 5, wherein the first contact surface and the second contact surface are configured to separately engage the first retention structure in a same direction along the channel between the first retention structure and the second retention structure.

7. The mount of claim 5, wherein the second contact surface is not engaged with either of the first retention structure and the second retention structure in the first orientation of the outer plate relative to the inner plate and the first contact surface is not engaged with either of the first retention structure and the second retention structure in the second orientation of the outer plate relative to the inner plate.

8. The mount of claim 5, wherein the channel has a dovetail shape along two dimensions of the channel, and wherein one dimension of the two dimensions is along a support surface of the base between the first retention structure and the second retention structure.

9. The mount of claim 1, wherein the first locking element is moveable in a first direction between an unlocked position and a locked position, the first direction perpendicular to a second direction in which the first contact surface and the second contact surface are configured to separately engage the first retention structure.

10. The mount of claim 1, wherein the outer plate comprises a second retention structure and the first locking element selectively engages the first retention structure in the first orientation of the outer plate relative to the inner plate and the first locking element selectively engages the second retention structure in the second orientation of the outer plate relative to the inner plate.

11. The mount of claim 1, wherein the inner plate includes a first locking surface configured to lock the outer plate to the inner plate in each of the first orientation of the outer plate relative to the inner plate and the second orientation of the outer plate relative to the inner plate.

12. The mount of claim 11, wherein the outer plate comprises a moveable second locking element, and wherein the first locking element selectively engages the first locking surface in the first orientation of the outer plate relative to the inner plate and the second locking element selectively engages the first locking surface in the second orientation of the outer plate relative to the inner plate.

13. The mount of claim 12, wherein the inner plate further comprises a second locking surface configured to lock the outer plate to the inner plate in each of the first orientation of the outer plate relative to the inner plate and the second orientation of the outer plate relative to the inner plate, and wherein the first locking element selectively engages the second locking surface in the second orientation of the outer plate relative to the inner plate and the second locking element selectively engages the second locking surface in the first orientation of the outer plate relative to the inner plate.

14. The mount of claim 1, wherein the first retention structure includes a retention surface configured to separately engage either the first contact surface or the second contact surface, the retention surface angled at an acute angle toward an adjacent surface of the inner plate.

15. The mount of claim 1, wherein the outer plate is configured to be rotated one-hundred eighty degrees about an axis between the first orientation and the second orientation.

16. A mounting system for multiple material thicknesses, comprising:
an outer plate including:
- a first coupler configured to physically connect the outer plate to an object;
- a locking element moveable between a locked position and an unlocked position;
- a first contact surface; and
- a second contact surface;

an inner plate selectively locked to the outer plate via the locking element, the inner plate including a first retention structure, wherein the first retention structure is configured to separately engage:

the first contact surface in a first orientation of the outer plate relative to the inner plate; and the second contact surface in a second orientation of the outer plate relative to the inner plate; and the object comprising a second coupler, the second coupler configured to connect to the first coupler to secure the object to the outer plate, wherein at least one surface of the object prevents the locking element from moving from the locked position to the unlocked position when the second coupler is connected to the first coupler.

17. The system of claim 16, wherein:

the inner plate comprises a locking surface positioned to selectively engage the locking element in the locked position;

the locking element is configured to selectively engage the locking surface in a first direction; and the at least one surface prevents movement of the locking element in a second direction when the second coupler is connected to the first coupler, wherein the first direction is perpendicular to the second direction.

18. The system of claim 16, wherein the locking element is configured to rotate between the locked position and the unlocked position.

19. The system of claim 16, wherein the inner plate includes a channel with a dovetail shape along two dimensions of the channel, and wherein the channel is positioned along a surface of the inner plate.

20. The system of claim 16, wherein the object is a portable camera.

21. A mount for multiple material thicknesses, comprising:

an outer plate including:

a coupler configured to physically connect the outer plate to an object;

a moveable first locking element;

a first contact surface; and a second contact surface; and an inner plate including a first retention structure, wherein the first retention structure is configured to separately engage:

the first contact surface in a first orientation of the outer plate relative to the inner plate; and the second contact surface in a second orientation of the outer plate relative to the inner plate, and wherein the first locking element:

selectively engages the inner plate in the first orientation of the outer plate relative to the inner plate to lock the outer plate to the inner plate in the first orientation of the outer plate relative to the inner plate; and selectively engages the inner plate in the second orientation of the outer plate relative to the inner plate to lock the outer plate to the inner plate in the second orientation of the outer plate relative to the inner plate, wherein the outer plate further includes:

a third contact surface;

a fourth contact surface, wherein the inner plate includes a second retention structure configured to separately engage:

the third contact surface in the first orientation of the outer plate relative to the inner plate; and the fourth contact surface in the second orientation of the outer plate relative to the inner plate;

a first flange including the first contact surface and the fourth contact surface; and a second flange including the second contact surface and the third contact surface.

\* \* \* \* \*